(12) United States Patent
Nakanishi

(10) Patent No.: US 9,664,287 B2
(45) Date of Patent: May 30, 2017

(54) SHAFT SEAL DEVICE, SEAL MEMBER AND HYDROELECTRIC POWER GENERATION DEVICE

(71) Applicant: National University Corporation Kumamoto University, Kumamoto-shi, Kumamoto (JP)

(72) Inventor: Yoshitaka Nakanishi, Kumamoto (JP)

(73) Assignee: National University Corporation Kumamoto University, Kumamoto (JP)

( * ) Notice: Subject to any disclaimer, the term of this patent is extended or adjusted under 35 U.S.C. 154(b) by 0 days.

(21) Appl. No.: 14/647,625

(22) PCT Filed: Nov. 27, 2013

(86) PCT No.: PCT/JP2013/081899
§ 371 (c)(1),
(2) Date: May 27, 2015

(87) PCT Pub. No.: WO2014/084257
PCT Pub. Date: Jun. 5, 2014

(65) Prior Publication Data
US 2015/0300496 A1 Oct. 22, 2015

(30) Foreign Application Priority Data

Nov. 28, 2012 (JP) .................................. 2012-260013
Jul. 25, 2013 (JP) .................................. 2013-154188

(51) Int. Cl.
*F16J 15/34* (2006.01)
*F16J 15/20* (2006.01)
(Continued)

(52) U.S. Cl.
CPC ............. *F16J 15/20* (2013.01); *F03B 11/006* (2013.01); *F16J 15/068* (2013.01); *F16J 15/16* (2013.01);
(Continued)

(58) Field of Classification Search
CPC ....... F16J 15/34; F16J 15/3404; F16J 15/3408
See application file for complete search history.

(56) References Cited

U.S. PATENT DOCUMENTS 4,546,033 A * 10/1985 Tsuchimoto ......... C09K 3/1028
277/592
4,777,065 A 10/1988 Hirao et al.
(Continued)

FOREIGN PATENT DOCUMENTS

JP          7-41784 A       2/1995
JP          7-165932        6/1995
(Continued)

*Primary Examiner* — Gilbert Lee
(74) *Attorney, Agent, or Firm* — Norris McLaughlin & Marcus, P.A.

(57) ABSTRACT

Provided is a shaft seal device provided with a seal member which possesses excellent liquid tightness, small friction resistance and high wear resistance. In a shaft seal device which is arranged around the periphery of a shaft which is supported in a rotatable manner or in a reciprocating manner, and is provided with a seal member for securing liquid tightness around the shaft, the seal member is formed of a porous body formed by using a hydrophilic polymer resin in which chains are cross-linked. The shaft seal device is also characterized in that: the shaft is a shaft which extends between a liquid phase region and a gas phase region; the seal member is a seal member which suppresses a leakage of a liquid to the gas phase region from the liquid phase region; and an aqueous lubricant which is prepared by adding a water soluble thickening agent is impregnated into the seal member.

11 Claims, 28 Drawing Sheets

(51) Int. Cl.
*F16J 15/06* (2006.01)
*F16J 15/16* (2006.01)
*F03B 11/00* (2006.01)
*F16J 15/18* (2006.01)
*B29K 105/04* (2006.01)

(52) U.S. Cl.
CPC ........... *F16J 15/162* (2013.01); *F16J 15/181* (2013.01); *F16J 15/182* (2013.01); *F16J 15/3404* (2013.01); *F16J 15/3496* (2013.01); *B29K 2105/04* (2013.01)

(56) References Cited

U.S. PATENT DOCUMENTS

| | | | | |
|---|---|---|---|---|
| 5,080,378 A | * | 1/1992 | Kagawa | C04B 35/565 277/404 |
| 5,441,799 A | * | 8/1995 | Owens | C04B 38/00 277/404 |
| 5,707,065 A | * | 1/1998 | Azema | C04B 35/565 277/405 |
| 6,338,906 B1 | * | 1/2002 | Ritland | B01D 29/111 257/E23.067 |
| 6,528,168 B1 | * | 3/2003 | Matsumoto | B22D 41/32 277/404 |
| 2005/0181197 A1 | | 8/2005 | Masuyama et al. | |
| 2013/0310772 A1 | * | 11/2013 | Minagawa | C08C 19/28 604/265 |
| 2014/0167361 A1 | * | 6/2014 | Osada | F16J 15/34 277/400 |

FOREIGN PATENT DOCUMENTS

| | | |
|---|---|---|
| JP | 2001-165324 A | 6/2001 |
| JP | 2001-342277 | 12/2001 |
| JP | 2009-085337 | 4/2009 |
| JP | 2011-058644 | 3/2011 |
| JP | 2012-137192 | 7/2012 |
| WO | 2010/056613 A1 | 5/2010 |

* cited by examiner (A) Intermolecular reaction (B) Intramolecular reaction (1-3 glycol)

(C) Intramolecular reaction (1-2 glycol)

SHAFT SEAL DEVICE, SEAL MEMBER AND HYDROELECTRIC POWER GENERATION DEVICE

TECHNICAL FIELD

The present invention relates to a shaft seal device, a seal member and a hydroelectric power generation device.

BACKGROUND ART

Conventionally, with respect to a mechanical part which can be used in various fields, there has been known a mechanical part provided with a shaft which is rotated or moved in a reciprocating manner. To name specific examples of such a mechanical part, a motor or a pump provided with a drive shaft, a cylinder provided with a rod and the like can be named.

There is a case where such a mechanical part includes a shaft seal device such as an oil seal or a mechanical seal for preventing a leakage of a liquid from the periphery of a shaft.

For example, in case of a liquid feed pump, a shaft seal device is adopted around a drive shaft for preventing a leakage of a liquid to be fed along the drive shaft.

In case of the cylinder which is driven by a liquid pressure, a shaft seal device is provided for preventing a leakage of a working fluid along a rod.

It is necessary to bring these shaft seal devices in a state where friction resistance is made as small as possible to prevent the friction resistance from obstructing driving of the shaft seal device while maintaining sufficient liquid lightness, and various constitutions have been proposed for this end heretofore.

For example, in a so-called oil-seal-type shaft seal device disclosed in patent document 1, liquid tightness is realized while allowing a shaft to be slidable by bringing a rubber-made lip seal arranged on an outer periphery of a shaft coaxially into contact with a surface of the shaft.

A so-called mechanical-seal-type shaft seal device disclosed in patent document 2 includes: a rotary ring mounted on a sleeve which is rotated together with a shaft; and a fixed ring which is brought into slide contact with the rotary-ring on a slide surface perpendicular to the shaft, and the shaft is made rotatable while maintaining liquid tightness on the slide surface.

CITATION LIST

Patent Document

Patent document 1: JP-A-2012-137192
Patent document 2: JP-A-2011-058644

SUMMARY OF INVENTION

Technical Problem

However, it is not yet safe to say that both the sufficient liquid tightness and sufficiently low friction resistance are achieved by the above-mentioned conventional shaft seal devices.

The present invention has been made in view of the above-mentioned circumstances, and it is an object of the present invention to provide a shaft seal device provided with a seal member having excellent liquid tightness, small friction resistance and high wear resistance.

Means for Solving the Problem

To overcome the above-mentioned conventional drawbacks, the present invention provides a shaft seal device which is arranged around the periphery of a shaft which is supported in a rotatable manner or in a reciprocating manner, and is provided with a seal member for securing liquid tightness around the shaft, wherein the seal member is formed of a porous body formed by using a hydrophilic polymer resin in which chains are cross-linked.

As another specific mode of the present invention, the shaft may be a shaft which extends between a liquid phase region and a gas phase region, and the seal member may be a seal member which suppresses a leakage of a liquid to the gas phase region from the liquid phase region.

As still another specific mode of the present invention, the shaft may be a shaft which extends between a first liquid phase region present on one end side of the shaft and a second liquid phase region present on the other end side of the shaft, and the seal member suppresses the communication of a liquid between the first liquid phase region and the second liquid phase region.

As still another specific mode of the present invention, an aqueous lubricant which is prepared by adding a water soluble thickening agent may be impregnated into the seal member.

As still another specific mode of the present invention, the thickening agent may be polyethylene glycol.

As still another specific mode of the present invention, the hydrophilic polymer may be polyvinyl formal in which chains of polyvinyl alcohol are cross-linked by formaldehyde.

As still another specific mode of the present invention, the seal member may be coaxially disposed with the shaft in a state where the seal member is brought into slide contact with an outer peripheral surface of the shaft.

As still another specific mode of the present invention, a plurality of seal members may be provided.

As still another specific mode of the present invention, the shaft seal device may include: a rotary ring which is coaxially mounted on an outer periphery of the shaft and follows rotational movement of the shaft in a shaft circumferential direction; and a fixed ring which is coaxially mounted on the outer periphery of the shaft in a state where the fixed ring is brought into slide contact with the rotary ring, and has rotational movement thereof in the shaft circumferential direction of the shaft restricted, and the seal member may be provided to a slide contact portion between the rotary ring and the fixed ring.

As another aspect of the present invention, there is provided a seal member of a shaft seal device which is arranged on a periphery of a rotatably supported shaft for securing liquid tightness around the shaft, wherein the seal member is formed into a porous state using a hydrophilic polymer resin in which chains are cross-linked.

According to another aspect of the present invention, a porous body formed by using a hydrophilic polymer resin in which chains are cross-linked is used as the seal member in the shaft seal device.

The present invention also provides a hydroelectric power generation device provided with the above-mentioned seal member or shaft seal device.

Advantageous Effect of Invention

According to the shaft seal device of the present invention, in the shaft seal device which is arranged around the periphery of the shaft which is supported in a rotatable manner or in a reciprocating manner, and is provided with the seal member for securing liquid tightness around the shaft, the seal member is formed of a porous body formed by using a hydrophilic polymer resin in which chains are cross-linked. Accordingly, it is possible to provide the shaft seal device provided with the seal member which possesses excellent liquid tightness, small friction resistance and high wear resistance.

By adopting the constitution where the shaft is a shaft which extends between a liquid phase region and a gas phase region, and seal member is a seal member which suppresses a leakage of a liquid to the gas phase region from the liquid phase region, it is possible to provide the shaft seal device provided with the seal member which possesses excellent liquid tightness, small friction resistance and high wear resistance.

Further, by adopting the constitution where the shaft is a shaft which extends a first liquid phase region present on one end side of the shaft and a second liquid phase region present on the other end side of the shaft, and the seal member suppresses the communication of a liquid between the first liquid phase region and the second liquid phase region, it is possible to provide the shaft seal device provided with the seal member which possesses excellent liquid tightness, small friction resistance and high wear resistance.

By impregnating an aqueous lubricant which is prepared by adding a water soluble thickening agent into the seal member, compared to the case where oil lubricant is used, it is possible to further reduce friction resistance while suppressing an environmental load to a water phase region by a lubricant as much as possible.

By using polyethylene glycol as the thickening agent, friction resistance can be reduced while further suppressing an environmental load to a water phase region by a lubricant.

By using polyvinyl formal in which chains of polyvinyl alcohol are cross-linked by formaldehyde as the hydrophilic polymer, it is possible to provide the shaft seal device provided with the seal member which possesses excellent liquid tightness, low friction resistance and wear resistance.

By providing the seal member coaxially with the shaft in a state that the seal member is brought into slide contact with the outer peripheral surface of the shaft, it is possible to provide an oil-seal-type shaft seal device provided with a seal member which possesses excel lent water tightness, small friction resistance and high wear resistance.

By providing a plurality of seal members, it is possible to provide the shaft seal device which possesses excellent liquid tightness while sufficiently suppressing friction resistance.

By configuring the shaft seal device such that the shaft seal device includes: a rotary ring which is coaxially mounted on an outer periphery of the shaft and follows rotational movement of the shaft in a shaft circumferential direction; and a fixed ring which is coaxially mounted on the outer periphery of the shaft in a state where the fixed ring is brought into slide contact with the rotary ring, and has rotational movement thereof in the shaft circumferential direction of the shaft restricted, and the seal member is provided to a slide contact portion between the rotary ring and the fixed ring, it is possible to provide a mechanical-seal-type shaft seal device provided with a seal member which possesses excellent water tightness, small friction resistance and high wear resistance.

Further, according to the present invention, in a seal member of a shaft seal device which is arranged on a periphery of a rotatably supported shaft for securing liquid tightness around the shaft, the seal member is formed into a porous state using a hydrophilic polymer resin in which chains are cross-linked. Accordingly, it is possible to provide a seal member which possesses excellent water tightness, small friction resistance and high wear resistance.

Further, according to the present invention, by using a porous body formed by a hydrophilic polymer resin in which chains are cross-linked as the seal member in the shaft seal device, it is possible to provide the shaft seal device provided with the seal member which possesses excellent water tightness, small friction resistance and high wear resistance.

Further, according to the present invention, a hydroelectric power generation device provided with the above-mentioned shaft seal device is provided. Accordingly, it is possible to provide the hydroelectric power generation device which can prevent the intrusion of water into the inside of the power generation device as much as possible, and also can efficiently generate electric power with small friction.

BRIEF DESCRIPTIONS OF THE DRAWINGS

BEST MODE FOR CARRYING OUT THE INVENTION

Figure 1:
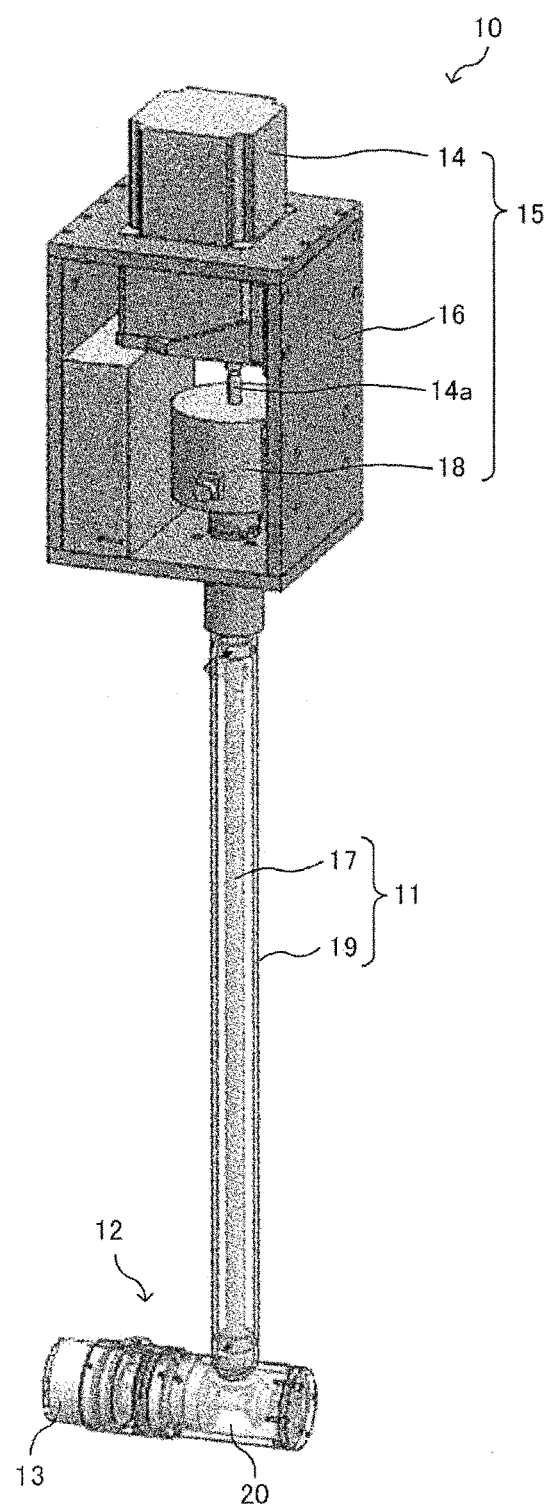
FIG. 1 is an explanatory view showing the constitution of a shaft seal device and a testing device of a seal member according to an embodiment of the present invention.

The shaft seal device according to the present embodiment is arranged around the periphery of a shaft which is supported so as to allow rotation and/or reciprocation of the shaft, and is provided with a seal member for securing liquid-tightness around the shaft, wherein the seal member is formed of a porous body formed by using a hydrophilic polymer resin in which chains are cross-linked.

To facilitate the understanding of the present invention, the process through which the inventors of the present invention have completed the present invention will be first described.

As described above, various types of shaft seal devices for securing liquid-tightness around a shaft have been conventionally proposed, but there is still room for improvement with regard to the compatibility between liquid-tightness and low friction resistance (smoothness).

That is, by bringing a lip portion into close contact with the drive shaft or by bringing a fixed ring into close contact with a rotary ring that rotates together with the drive shaft, liquid-tightness is improved. However, the friction resistance increases. On the other hand, by alleviating such contacts, friction resistance can be reduced. In this case, however, liquid-tightness decreases.

Therefore, the current situation is that there is a demand for a new technique for further improving the compatibility between liquid-tightness and low friction resistance which contradict each other.

On the other hand, the inventors of the present invention have made extensive studies on medical equipment such as prosthetic joints and intramedullary nails over many years from an engineering point of view.

In the course of such studies, the inventors of the present invention have come up with the idea that a mechanism that generates smooth movement in human joint parts may greatly contribute to the compatibility between liquid-tightness and low friction resistance in shaft seal devices.

Then, in the course of intensive studies made thereafter, the inventors have found that a porous body is formed using a cross-linked hydrophilic polymer resin and that a shaft seal device having excellent liquid-tightness and low friction resistance can be realized by using such a porous body as a seal member, and have completed the present invention.

That is, it can be said that an idea of the present invention is obtained by focusing on excellent functions that a living thing has, and the present invention relates to a shaft seal device which is realized based on an artificial material or the combination of the artificial materials, that is, a shaft seal device which includes a bio-mimetic seal as a seal member.

Here, the seal member, which is one of the technical features of the present invention, is a member for securing liquid-tightness in the shaft seal device. To explain the seal member by taking a conventional shaft seal device as an example, for example, the seal member corresponds to a Hp portion made of rubber or the like in the case of an oil seal, and the seal member corresponds to a member that forms a slide portion between a fixed ring and a rotary ring in the case of a mechanical seal.

In the shaft seal device according to the present embodiment, a porous body formed by using a hydrophilic polymer resin, in which chains are cross-linked is used as the seal member.

A method of forming a porous body is not particularly limited provided that the method can be used in general at the time of making the resin porous. As examples of the method, a method of forming a porous body by generating foams in a resin by mixing a predetermined foaming agent and a method of forming a porous body by mixing micro bubbles into a resin can be given.

Although, the pore diameter in the porous body is not particularly limited, the pore diameter may be set to 1000 μm to 0.1 μm, and may preferably be set to about 700 μm to 1 μm, for example. It is preferable that the pore diameter preferably do not exceed 1000 μm, since this reduces a strength of the porous body. It is also preferable that the pore diameter be not less than 0.1 μm, since there is a possibility that it is difficult to acquire the sufficient impregnation of a liquid for securing liquid-tightness or the impregnation of a lubricant described later. By defining the pore diameter to a value which falls within a range of 1000 μm to 0.1 μm, and preferably to a value which falls within a range of about 700 μm to 1 μm, a porous body having excellent impregnation property while having a sufficient strength can be acquired.

A hydrophilic polymer used in the forming of the porous body is not particularly limited and, for example, polyvinyl alcohol, hydrophilized or porous-made polyethylene, rubber, polystyrene, vinyl chloride, an olefin resin, a urethane resin and the like may be used.

Among these hydrophilic polymers, polyvinyl alcohol is preferable, since polyvinyl alcohol exhibits excellent low friction resistance and can prevent the seal member from obstructing the movement of the shaft as much as possible.

In forming the porous body, a resin in which the hydrophilic polymer is cross-linked is used. With the use of such a resin, a strength and wear resistance of the porous body can be improved so that the porous body can acquire liquid-tightness in a stable manner.

To be more specific, in the case of adopting polyvinyl alcohol as a hydrophilic polymer, in forming a porous body, polyvinyl formal obtained by formalization of polyvinyl alcohol with formaldehyde is used.

Particularly, a porous body formed by using polyvinyl formal has excellent low friction resistance, excellent wear resistance and an excellent strength and is useful for the forming of the seal member.

In forming the porous body, a crosslinking ratio is preferably set to a value which falls within a range of 1 to 87% and is more preferably set to a value which falls within a range of 20 to 80%. When the crosslinking ratio is lower than 20%, a strength and a wear resistance of the formed porous body are lowered although a formed porous body may be usable, and when the crosslinking ratio is lower than 1%, a wear resistance is remarkably lowered so that the porous body exhibits a poor practical use. Accordingly, such lowering of the crosslinking ratio is not desirable. On the other hand, when the crosslinking ration exceeds 80%, the formed porous body loses flexibility although the formed porous body is usable, and when the crosslinking ratio exceeds 87%, the porous body will lose flexibility to the extent that the porous body exhibits a poor practical use so that the followability of the porous body to a target member with which the porous body is brought into slide contact (hereinafter referred to as "target slide contact member") is lowered. Accordingly, such exceeding of the crosslinking ratio is also not desirable. By setting the crosslinking ratio to a value which falls within a range of 1 to 87%, and preferably 20 to 80%, a porous body having an excellent strength and the excellent followability to the target slide contact member can be formed.

The shaft which is supported in rotating manner or in a reciprocating manner may be a shaft which extends between a liquid phase region and a gas phase region, and the seal member may be a seal member which suppresses a leakage of a liquid to the gas phase region from the liquid phase region, "rotation" described previously means the rotation of the shaft about an axis of the shaft, and "reciprocation" means the movement of the shaft in the axial direction.

To be more specific, the shaft which is supported in rotating manner or in a reciprocating manner may be a shaft which extends between a water phase region and a gas phase region, and the seal member may be a seal member which suppresses a leakage of moisture in a liquid form to the gas phase region from the water phase region.

Due such a constitution, for example, in a mechanical part used in a state where the mechanical part is submerged in a liquid phase such as water or oil, to be more specific, in a mechanical part provided with an underwater impeller, it is possible to provide a shaft, seal device which has small friction resistance while effectively preventing the intrusion of liquid such as intrusion of water, for example, into a gas phase region in which a mechanical part or the like is housed.

The shaft which is supported in a rotatable manner or in a reciprocating manner may be a shaft which extends between a first liquid phase region present on one end side of the shaft and a second liquid phase region present on the other end side of the shaft, and the seal member may be a seal member which suppresses the communication of a liquid between the first liquid phase region and the second liquid phase region.

Due to such a constitution, it is possible to provide a shaft seal device having low friction resistance while effectively suppressing the intrusion of a liquid in a first liquid phase to a second liquid phase, and the intrusion of a liquid in a second liquid phase to a first liquid phase. It is understood that a liquid that forms the first liquid phase region and a liquid which forms a second liquid phase region are water, oil or the like, for example.

In addition, an aqueous lubricant which is prepared by adding a water soluble thickening agent to an aqueous solvent may be impregnated into the seal member.

The viscosity of a prepared aqueous lubricant may be set to, for example, a value which falls within a range of 0.001 to 1000 Pa·s, and more specifically to a value which falls within a range of 0.002 to 100 Pa·s. It is not desirable that viscosity exceeds 1000 Pa·s because friction resistance of the seal member will increase when viscosity exceeds 1000 Pa·s. In addition, it is not desirable that viscosity is lower than 0.001 Pa·s because the formation of a lubricant membrane between friction surfaces becomes insufficient when viscosity is lower than 0.001 Pa·s. By setting viscosity to a value which falls within a range of 0.001 to 1000 Pa·s, and more preferably to a value which falls within a range of 0.002 to 100 Pa·s, it is possible to provide a shaft seal device having excellent liquid-tightness and excellent low friction resistance.

Regardless of whether viscosity of an aqueous lubricant is within or outside the viscosity range described above, an aqueous lubricant may have a non-Newtonian property in which viscosity changes corresponding to a shear force. With the use of an aqueous lubricant having a non-Newtonian property, the viscosity of the aqueous lubricant becomes high when the movement of a shaft is slow so that the aqueous lubricant is useful for reducing friction resistance at a time of starting the movement of the shaft, while the viscosity of the aqueous lubricant becomes low when the movement of a shaft is fast so that the aqueous lubricant is useful for reducing resistance against the shaft attributed to the lubricating liquid at a time of operating the shaft at a high speed. Accordingly, the aqueous lubricant having a non-Newtonian property is useful.

To explicitly express such an aqueous lubricant having a non-Newtonian property, an aqueous lubricant where viscosity changes within a range of 0.001 to 1000 Pa·s can be used, for example.

For example, an aqueous lubricant prepared by adding polyethylene glycol as a thickening agent cars be used as such an aqueous lubricant.

Since polyethylene glycol is biodegradable, even in the event that an aqueous lubricant leaks into the nature by any chance, the use of the aqueous lubricant can reduce an environmental load compared to an oil-based lubricant, for example.

As polyethylene glycol to be added to an aqueous solvent, polyethylene glycol having a single molecular weight or polyethylene glycol having a plurality of different molecular weights may be used.

That is, the molecular weight distribution of polyethylene glycol molecules in an aqueous lubricant which uses polyethylene glycol may be composed of one main peak or may be composed of two or more main peaks. Here, "main peak" intends to mean a peak that exerts an outstanding effect on functions of a lubricant. Accordingly, for example, a small peak generated by breaking of molecule chains or the like is not included in "main peak" provided that such peak does not exert an outstanding effect on functions of a lubricant.

For example, in the case where polyethylene glycol has the molecular weight distribution which is composed of two or more main peaks, it is possible to provide an aqueous lubricant which is easily impregnated into the seal member (porous body) and can exhibit sufficient viscosity even when the shaft is being operated. To exemplify a more specific example, an aqueous lubricant may be prepared by using polyethylene glycol having a mean molecular weight of 20,000 and polyethylene glycol having a mean molecule weight of 500,000, for example.

A porous body formed by using the above-mentioned polyvinyl formal is formed in a state where pores formed in the porous body are communicate with each other thus forming communicating pores having neck portions. The above-mentioned lubricant infiltrates into the inside of the communicating pores and hence, appropriate flow resistance is generated whereby the porous body can maintain low friction resistance while suppressing the loss of the lubricant.

In the same manner as the conventional oil seal, the seal member may be coaxially mounted on the shaft in a state where the seal member is brought into slide contact with an outer peripheral surface of the shaft.

That is, by adopting the seal member provided with the porous body instead of the lip member of the conventional oil seal, it is possible to provide an oil-seal-type shaft seal device which exhibits small friction resistance and excellent liquid-tightness.

A plurality of seal members may be coaxially mounted on the shaft in a state that the seal members are brought into slide contact with an outer peripheral surface of the shaft. Due to such a constitution, it is possible to provide an oil-seal-type shaft seal device which exhibits further excellent liquid-tightness.

The seal member may be applied to a slide portion of a conventional mechanical seal.

That is, the shaft seal device may include: a rotary ring which is coaxially mounted on an outer periphery of the shaft and follows rotational movement of the shaft in a shaft circumferential direction; and a fixed ring which is coaxially mounted on the outer periphery of the shaft in a state where the fixed ring is brought into slide contact with the rotary ring, and has rotational movement thereof in the shaft circumferential direction of the shaft restricted, and the seal member is provided to a slide contact portion between the rotary ring and the fixed ring.

Due to such a constitution, it is possible to provide a mechanical seal-type shaft seal device having low friction resistance and also having excellent liquid-tightness.

As described previously, the shaft seal device and the seal member according to this embodiment are applicable to mechanical parts in various technical fields provided with a drive shaft. On the other hand, as one example of the case where the present invention is particularly useful, the inventors of the present invention estimate a technical field where electric power is generated by making use of the flow of water in river, sea, lake or the like. In the explanation made hereinafter, the present invention is explained by taking tidal flow power generation as a representative example of power generation which makes use of such flow of water.

In tidal flow power generation, a force receiving mechanism provided with an impeller is arranged in a region below a sea water level (under seawater) where an ocean current or a tidal current generated by a tidal force exists, and power is generated by driving the impeller by a tidal flow.

Conventionally, several attempts have been made with respect to tidal flow power generation per se. However, there have been cases where it is difficult to maintain water tightness between the undersea which is in a water phase region and the inside of a force receiving mechanism which is in a gas phase region over a long period depending on the depth of water or the like, and the maintaining of water tightness is still an important task to be solved.

In view of such a circumstance, it is often the case where a generator is not disposed in the inside of the force receiving mechanism in preparation for a possibility that the generator is immersed in water.

Accordingly, in this case, a gear mechanism such as bevel gears is mounted on the other end portion of a drive shaft of the impeller which is rotated by a tidal flow, a power transmission shaft which extends in the direction toward an area above sea level is provided by way of the gear mechanism, and power generator installed above sea is driven thus generating electric power.

However, in such a power transmission method, it is necessary to drive the power transmission shaft having a length substantially equal to the depth of water, and a power transmission loss caused by friction in the gear mechanism is also large. Accordingly, it must be said that this power transmission method is inefficient in a technical field of power generation where it is desirable to generate the electric power as large as possible.

Under such a circumstance, by providing the shaft seal device according to this embodiment to the force receiving mechanism, it is possible to realize both of high water tightness and low friction resistance property and hence, a power generator can be provided to the force receiving mechanism whereby tidal flow power generation can be performed extremely efficiently.

Further, by using an aqueous lubricant using water soluble thickening agent having biodegradable property (having a small environmental load) as in the case of polyethylene glycol described previously, while realizing high water tightness and low friction resistance property in the shaft seal device, even when the lubricant leaks into a water phase region by a chance, a damage given to an environment can be decreased as much as possible compared to a force receiving mechanism provided with a shaft seal device which uses an oily lubricant.

Hereinafter, the shaft seal device and the seal member according to this embodiment are further explained in detail.

1. Formation of Seal Member

Firstly, the formation of the seal member is explained. In this embodiment, the explanation is made with respect to the case where the seal member is formed using polyvinyl formal. However, a raw material for forming the seal member is not limited to polyvinyl formal as described previously.

In forming the seal member, first of all, polyvinyl alcohol having saponification of 86 to 90% and the average degree of polymerization of 1000 was dissolved into water such that, the content of polyvinyl alcohol becomes 10 to 15 weight % thus preparing a polyvinyl alcohol aqueous solution. When necessary, to facilitate the dissolution of polyvinyl alcohol, polyvinyl alcohol may be dissolved while heating water to a temperature of approximately 55° C.

Next, the obtained polyvinyl alcohol aqueous solution was held left at rest or was left at rest in vacuum for approximately 24 hours. Accordingly, the large babbles present in the polyvinyl alcohol aqueous solution are removed, and hence, a porous body having pores of a uniform size is formed.

Next, to 100 weight % of polyvinyl alcohol aqueous solution left at rest, 20 to 100 weight % of formaldehyde was added as a cross-linking agent, and 20 to 100 weight % of sulfuric acid was added as a catalyst which promotes cross-linking, and the mixture was stirred for 5 minutes so that the whole mixture became uniform. In this case, by suitably adding foaming agent or a soluble substance, a porous body having a large pore size can be acquired later. For example, Saponin can be used as a foaming agent. For example, starch can be used as a soluble substance.

Then, the mixed solution, was poured into the inside of a mold, and the solution was solidified by generating a cross-linking reaction in the solution at the temperature which falls within a range of room temperature to 60° C. for 24 to 72 hours.

Through these steps, a cylindrical and porous seal member A having an outer diameter of 50 mm, an inner diameter of 30 mm and a length of 30 mm was obtained. When the seal member was observed using a microscope, a diameter of holes was 700 µm and a pore ratio was 90%.

Using the substantially same method, a cylindrical seal member B having an outer diameter of 40 mm, an inner diameter of 30 mm, a length of 15 mm and having pores whose diameter is 80 µm and the pore ratio is 89% was also formed.

2. Preparation of Aqueous Lubricant

Next, the preparation of an aqueous lubricant is performed. Here, polyethylene glycol was used as a water-soluble thickening agent. To be more specific, the aqueous lubricant was prepared by dissolving polyethylene glycol in water such that the content of polyethylene glycol becomes 3 weight %. In dissolving polyethylene glycol into water, water may be stirred by a mixer or a shaking device while heating water to a temperature which falls within a range of a room temperature to approximately 60° C.

Following two kinds of aqueous lubricants were prepared by changing a molecular weight of polyethylene glycol.
Aqueous Lubricant X:

The aqueous lubricant X was prepared by using polyethylene glycol having an average molecular weight of 20,000 and polyethylene glycol having an average molecular weight of 500,000 at a weight ratio of 1:1 such that final concentration becomes 3%.
Aqueous Lubricant Y:

The aqueous lubricant Y was prepared by using polyethylene glycol having an average molecular weight of 2,000,000 such that final concentration becomes 3%.

3. Friction Torque Measurement Test

Next, an oil-seal-type shaft seal device is formed by using the seal member prepared in [1. Preparation of seal member] and an aqueous lubricant prepared in [2. Preparation of aqueous lubricant], and a comparison was made with respect to a friction torque between the oil-seal-type shaft seal device and an oil-seal-type shaft seal device which is formed by using conventional rubber.
(Constitution of Test Device)

Figure 2:
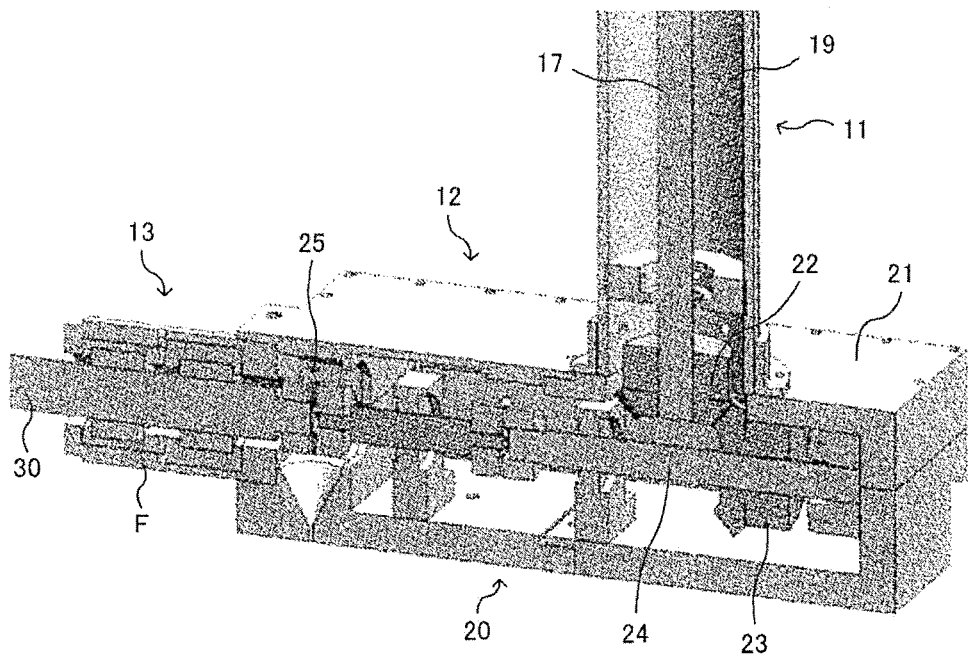
FIG. 2 is an explanatory view showing the constitution of the shaft seal device and the testing device of the seal member according to the embodiment of the present invention.
Figure 3A:
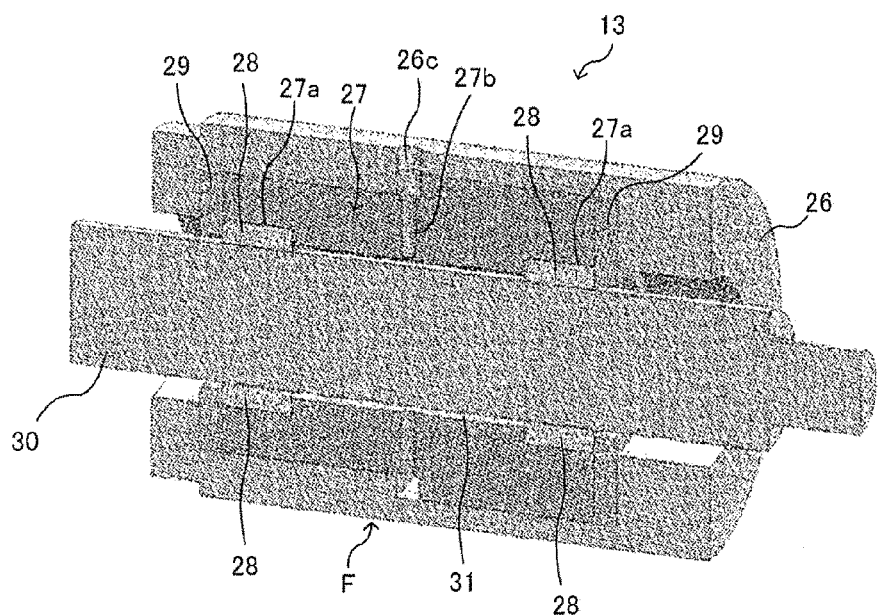
FIG. 3A and FIG. 3B are explanatory views showing the constitution of the shaft seal device and the testing device of the seal member according to the embodiment of the present invention.
Figure 3B:
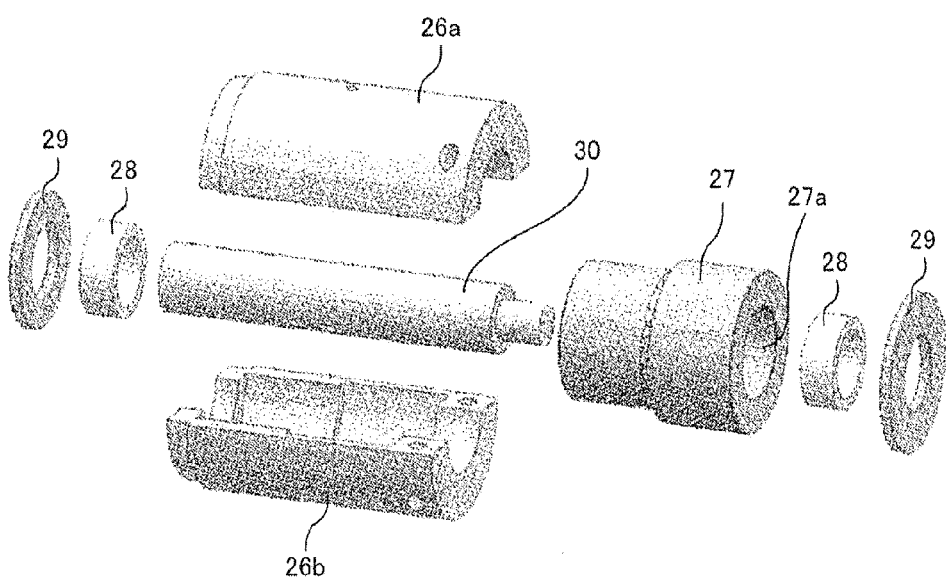

FIG. 1 to FIG. 3B show the constitution of a test device used in this friction torque measurement test. FIG. 1 is an explanatory view showing the overall constitution of the test device 10, FIG. 2 is a cross-sectional perspective view showing a power transmission part 11, a test part 12 and an area around the power transmission part 11 and the test part 12, and FIG. 3A and FIG. 3B are explanatory views showing the constitution of a test unit 13 arranged in the test part 12.

As shown in FIG. 1, the test device 10 includes: a drive part 15 provided with a drive motor 14; a power transmission part 11 for transmitting power generated by the drive part 15; and the test part 12 for driving the test unit 13 by power transmitted by the power transmission part 11.

The test device 10 drives the drive motor 14 in a state where a portion of the power transmission part 11 ranging from a middle portion to a lower portion is immersed in water, and a friction torque of a shaft seal device F arranged in the test unit 13 and described later is measured.

To explain the constitution of the test device 10 more specifically, in the drive part 15, the driver motor 14 which is driven with the supply of electricity is mounted on an upper portion of a casing 16 having an external appearance of an approximately box shape, and a vertical transmission shaft 17 of the power transmission part 11 is mounted on a motor shaft 14a of the drive motor 14 by way of a torque meter 18.

The torque meter 18 is electrically connected to a processing apparatus not shown in the drawing such as a computer, for example, and outputs a signal corresponding to a torque.

The power transmission part 11 is formed of: a vertical transmission shaft 17 which transmits power to the test part 12; and a transmission shaft outer sleeve 19 arranged on an outer periphery of the vertical transmission shaft 17. The transmission shaft outer sleeve 19 is a member for preventing the intrusion of water into the inside of the transmission shaft outer sleeve 19, and the vertical transmission shaft 17 is arranged in a gas phase even in a state where the power transmission part 11 is immersed into water.

The test part 12 is formed of, as also shown in FIG. 2, the test unit 13 provided with the shaft seal device F which is an object to be tested, and a gear part 20 which transmits power to the test unit 13 from the power transmission part 11.

The gear part 20 includes: a watertight casing 21 formed in a watertight manner; a drive bevel gear 22 mounted on a lower end of the vertical transmission shaft 17; a driven bevel gear 23 meshed with the drive bevel gear 22; and a horizontal transmission shaft 24 driven by the driven bevel gear 23. On the watertight casing 21 positioned at a distal end portion of the horizontal transmission shaft 24, a unit mounting part 25 on which the test unit 13 is mountable while ensuring water-tightness is formed.

The test unit 13 is, as shown in FIG. 3A and FIG. 3B, formed of a drive shaft 30; and the shaft seal device F. The shaft seal device F includes: an outer sleeve body 26; a shaft housing body 27; a seal member 28; and a pushing member 29.

The outer sleeve body 26 is a member which forms a profile of the test unit 13. As can be understood from FIG. 3B which is an exploded view, the outer sleeve body 26 is formed of two half-split outer sleeve bodies 26a, 26b. The outer sleeve body 26 houses therein the shaft housing body 27, the seal member 28, the pushing member 29 and the drive shaft 30, wherein the seal member 28 is exchangeable.

The shaft housing body 27 is an approximately cylindrical member which is mounted on an outer periphery of the drive shaft 30 and has a step on an outer surface thereof in the circumferential direction. A seal member housing part 27a whose inner diameter is enlarged is formed on both end portions of the shaft housing body 27.

The seal member 28 is a member for ensuring liquid tightness (water tightness) around the drive shaft 30. In this test, the test is performed by changing kinds of the seal member 28 or by mounting a conventional seal member.

The pusher member 29 is a ring-like member arranged on both end surfaces of the shaft housing body 27. The pusher member 29 is provided for preventing the removal of the seal member 28 from the shaft housing body 27.

A lubricant supply port 26c for supplying an aqueous lubricant to the inside of the test unit 13 is formed in the outer sleeve body 26. A plurality of lubricant introducing passages 27b are formed in a peripheral surface of the shaft housing body 27 in a penetrating manner from an outer peripheral surface to an inner peripheral surface. An aqueous lubricant supplied from the lubricant supply port 26c reaches a lubricant storing space 31 formed between the inner peripheral surface of the shaft housing body 27 and an outer peripheral surface of the drive shaft 30 through the lubricant introducing passages 27b, and is impregnated into the seal member 28.

(Test Method and Result)

Using the above-mentioned test device 10, the study was made on how a friction torque and a leakage water amount change in the seal member 28 when the seal member 28 and the composition of an aqueous lubricant are changed compared to a conventional rubber-made seal member.

As seal members to be used, two kinds of seal members consisting of the above-mentioned seal member A and seal member B formed in [1. Preparation of seal member] were used. As a comparison example, an oil seal (type: AC/AE1709A) made by NOK Corporation limited was used.

The closer a contact state between the seal member and the shaft, the smaller a leak amount is. However, when the seal member and the shaft are brought into an excessively close contact state, a friction force is increased and hence, the excessive contact is not desirable. The seal member A formed by molding into a shape having an outer diameter of 50 mm, an inner diameter of 30 mm and a width of 30 mm using PVF was arranged on a holder having an inner diameter of 50 mm and a width of 30 mm and, thereafter, a shaft having a diameter of 30 mm was inserted into the seal member A. The seal member B formed by molding into a shape having an outer diameter of 40 mm, an inner diameter of 30 mm and a width of 15 mm using PVF was arranged on a holder having an inner diameter of 37.5 mm and a width of 15 mm and, thereafter, a shaft having a diameter of 30 mm was inserted into the seal member B.

In performing the test using the seal member A and the seal member B, the lubrication was carried out by supplying an aqueous lubricant X or an aqueous lubricant Y prepared by [2. Preparation of aqueous lubricant]. The specific specifications of the respective seal members and the respective aqueous lubricants are shown in Table 1.

TABLE 1

|  | Seal member A | Seal member B | Comparison seal member |
| --- | --- | --- | --- |
| material | PVF | PVF | rubber |
| inner diameter | 30 mm | 30 mm | 30 mm |
| outer diameter | 50 mm | 40 mm | 50 mm |
| thickness | 10 mm | 5 mm | — |
| width | 30 mm | 15 mm | 11 mm |
| open pore diameter | 700 μm | 80 μm | — |
| open pore ratio | 90% | 89% | — |
| water retention ratio | 600% | 1000% | — |
| composition of lubricant | PEG: 3.0 wt % ratio between molecular weight of 20,000 and molecular weight of 500,000 being 1:1 | PEG: 3.0 wt % molecular weight of 2,000,000 | — |

The test was carried out in such a manner that the test part 12 and a portion of the power transmission part 11 extending over a middle portion of the power transmission part 11 were immersed into a water vessel filled with water such that the depth of water is 1 m, and a friction torque was calculated by subtracting a torque measured by the torque meter 18 in a state of not mounting the test unit 13 from a torque measured by the torque meter 18 in a state of mounting the test unit 13.

Figure 4:
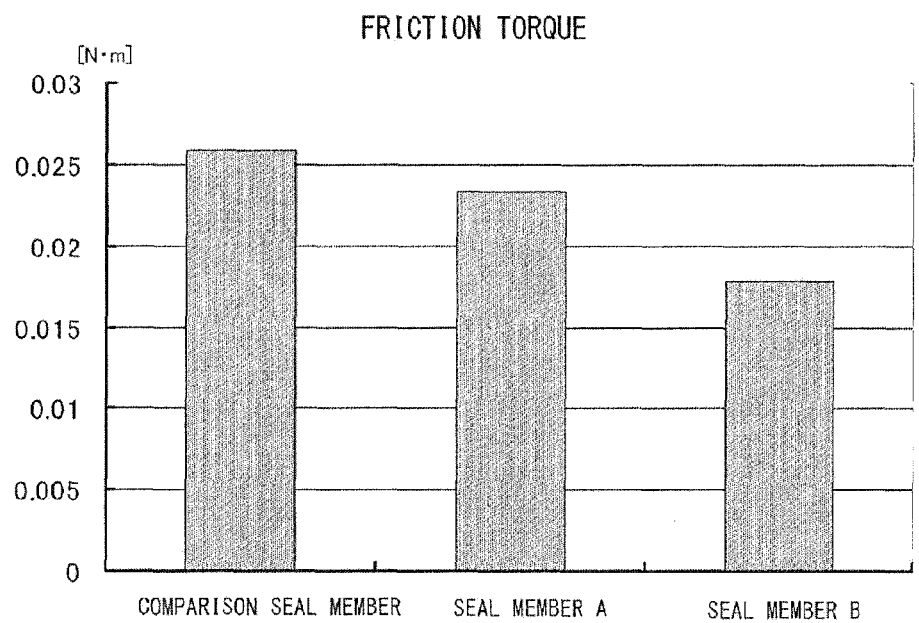
FIG. 4 is an explanatory view showing a result of a test of a friction torque.
Figure 5:
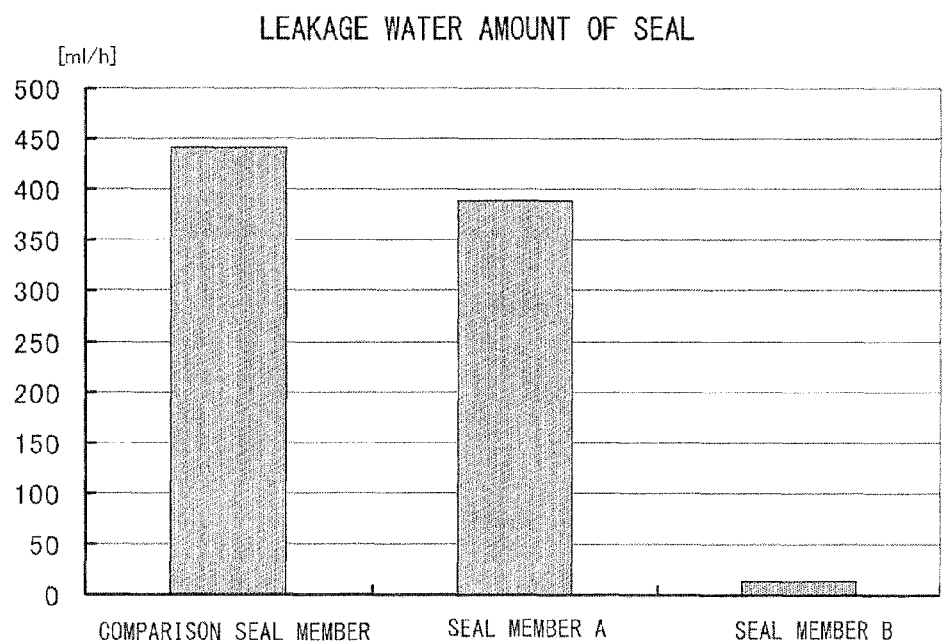
FIG. 5 is an explanatory view showing a result of a test on a leakage water amount.

The result of the test carried out in this manner is shown in FIG. 4 and FIG. 5. FIG. 4 is a graph showing a friction torque, and FIG. 5 is a graph showing a leakage water amount of a seal. As can be also understood from FIG. 4, the result was obtained where while a friction torque of the conventional comparison seal member made of rubber is 0.0259 N·m, both a friction torque of the seal member A and a friction torque of the seal member B are lower than the friction torque of the comparison seal member. That is, it is proved that the shaft seal device according to this embodiment provided with a seal member formed of a porous body made of a hydrophilic polymer resin in which chains are cross-linked exhibits favorable low friction resistance compared to the shaft seal device provided with the conventional seal device.

Particularly, while a friction torque of the seal member A is 0.0233N·m, a friction torque of the seal member B is 0.0179N·m and hence, it is proved that the seal member B exhibits the more excellent low friction resistance.

As can be also understood from FIG. 5, the result was obtained where while a leakage water amount of the comparison seal member is 442 ml/h, both a leakage water amount of the seal member A and a leakage water amount of the seal member B are lower than the leakage water amount of the comparison seal member. That is, it is proved that the shaft seal device according to this embodiment provided with a seal member formed of a porous body made of a hydrophilic polymer resin in which chains are cross-linked exhibits favorable water tightness (liquid tightness) compared to the shaft seal device provided with the conventional seal device.

Particularly, while a leakage water amount of the seal member A is 388 ml/h, a leakage water amount of the seal member B is 13.2 ml/h which is largely lower than 388 ml/h. To take into account the result of a friction torque shown in FIG. 4, it is safe to say that the seal member B and the shaft seal device provided with the seal member B are a seal member and a seal device which can satisfy both requirements which conflict each other, that is, the realization of extremely high-performance liquid tightness while exhibiting low friction resistance against the conventional shaft seal device.

4. Application Example 1

Next, a specific application example of a seal member and a shaft seal device according to this embodiment is further explained by reference to drawings.

Figure 6:
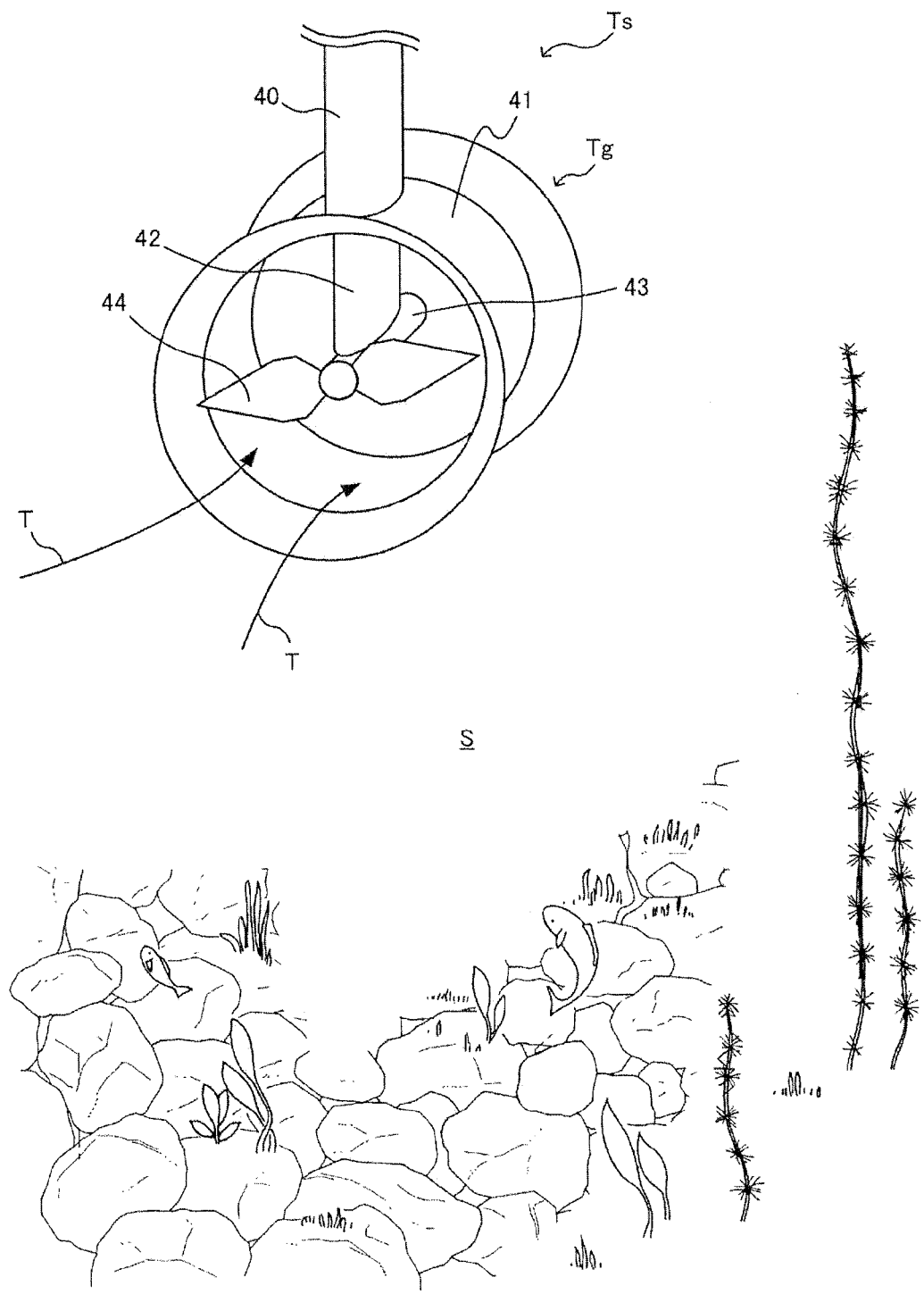
FIG. 6 is an explanatory view showing an application example of the shaft seal device and the seal member according to the embodiment of the present invention.

FIG. 6 is an explanatory view showing a force receiving mechanism Tg of a tidal flow power generation system Ts installed underwater S where a tidal flow T is present. The force receiving mechanism Tg is disposed on a lower end of a support portion 40 which extends downwardly into sea from a structure disposed above a sea level (not shown in the drawing). A body portion 43 is disposed in a hollow inner portion of an approximately cylindrical barrel portion 41 which gathers and straightens a tidal flow T by way of a body support portion 42.

An impeller 44 which is rotated by receiving a tidal flow T is disposed on a distal end of the body portion 43. A rotational force obtained by the impeller 44 is transmitted to the body portion 43 and the power generation is performed.

Figure 7:
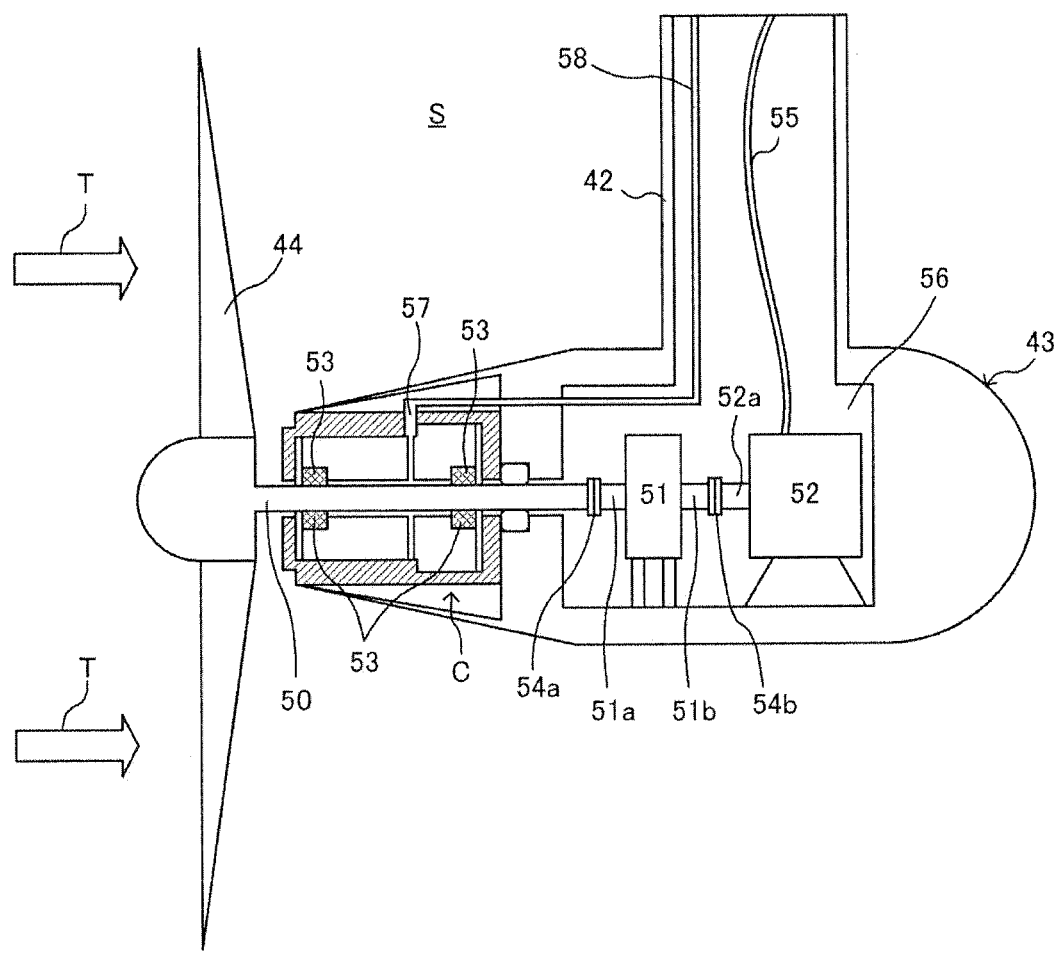
FIG. 7 is an explanatory view showing the constitution of a passive mechanism of a tidal flow power generation system.

FIG. 7 is a schematic view showing a cross section of the force receiving mechanism Tg. In FIG. 7, the barrel portion 41 is omitted. As shown in FIG. 7, the force receiving mechanism Tg includes: the impeller 44; a force receiving shaft 50 rotated by the impeller 44; a shaft seal device C disposed around the force receiving shaft 50; a transmission 51 which changes a rotational speed of the force receiving shaft 50; and a power generator 52 which converts rotational movement of the shaft whose rotational speed is changed by the transmission into electric power.

When the impeller 44 is rotated by a tidal flow T, a rotational force of the impeller 44 is transmitted to a transmission input shaft 51*a* of the transmission 51 disposed in the inside of a power generator housing portion 56 from the force receiving shaft 50 by way of a connecting portion 54*a*, is transmitted to a power generator shaft 52*a* by a transmission output shaft 51*b* by way of a connecting portion 54*b* with the increase of a rotational speed, for example, and the power generation is performed by the power generator 52. Power generated by the power generator 52 is supplied to a power receiving facility on the ground (not shown in the drawing) by way of a power transmission cable 55 installed in the inside of the body support portion 42.

The shaft seal device C arranged around the force receiving shaft 50 is provided for suppressing the intrusion of water (leakage of water) into the power generator housing portion 56 which is a gas phase region from underwater S which is a water phase region along the force receiving shaft 50. The shaft seal device C has substantially the same constitution as the shaft seal device F of the test unit 13 used in the previously-mentioned [3. Friction torque measurement test].

In the inside of the shaft seal device C, an annular seal member 53 formed of a porous body made of a hydrophilic polymer resin in which chains are cross-linked is disposed concentrically with the force receiving shaft 50 in a state where the seal member 53 is brought into slide contact with an outer peripheral surface of the force receiving shaft 50.

The seal member 53 is impregnated with an aqueous lubricant supplied through a lubricant supply port 57 formed in an outer peripheral surface of the shaft seal device C and hence, the seal member 53 can realize the extremely excellent low friction resistance while also ensuring high liquid tightness. An aqueous lubricant supplied to the lubricant supply port 57 is supplied from a part on the ground by way of an aqueous lubricant supply pipe 58 disposed on the body support portion 42.

Particularly, in this embodiment, an aqueous lubricant showing a non-Newton property using polyethylene glycol as a thickening agent is used and hence, even when an aqueous lubricant leaks to undersea S by a chance, an environmental load which an aqueous lubricant generates is extremely small compared to an environmental load which an oil lubricant generates.

In this manner, with the use of the force receiving mechanism Tg of the tidal flow power generation system Ts provided with the shaft seal device C according to this embodiment, the high liquid tightness can be realized. Accordingly, the generator 52 can be disposed in the inside of the body portion 43 disposed underwater S and hence, a mechanism which transmits power to a part on the ground becomes unnecessary whereby a power loss generated during the power transmission can be reduced thus enabling the efficient power generation.

Further, the shaft seal device C exhibits the extremely excellent low friction resistance and hence, the shaft seal device C can reduce a power loss caused by friction compared to a conventional shaft seal device whereby power generation efficiency can be accelerated.

5. Application Example 2

Next, another specific application example of a seal member and a shaft seal device according to this embodiment is explained by reference to drawings.

Figure 8A:
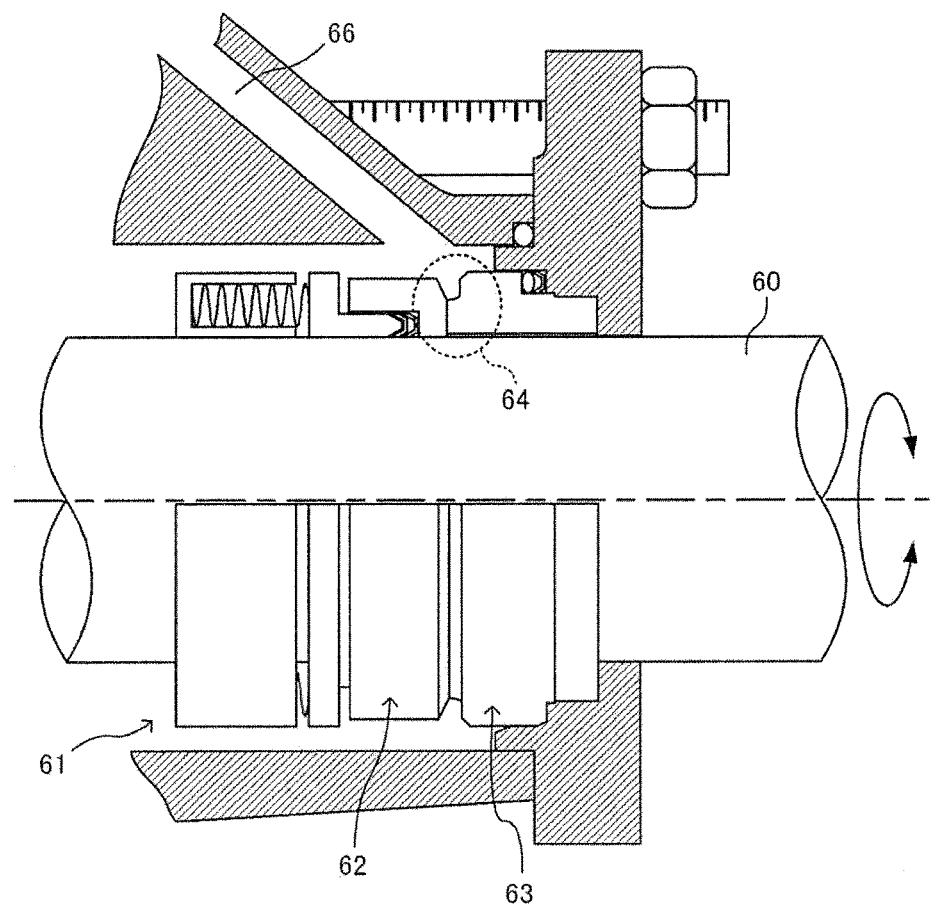
FIG. 8A and FIG. 8B are explanatory views showing another application example of the shaft seal device and the seal member according to the embodiment of the present invention.
Figure 8B:
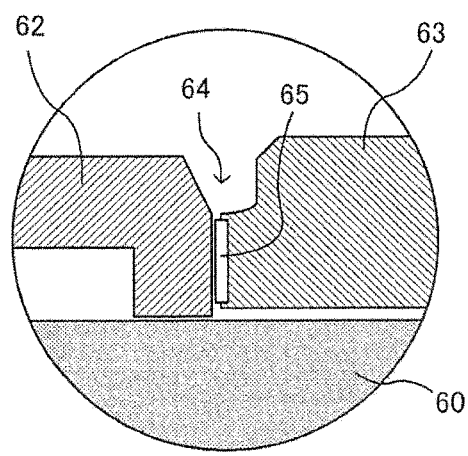

FIG. 8A and FIG. 8B are explanatory views with a part cut away of a mechanical seal 61 which forms a shaft seal device disposed in a mechanical part provided with a rotary shaft 60.

As shown in FIG. 8A, the mechanical seal 61 includes: a rotary ring 62 which is coaxially mounted on an outer periphery of the rotary shaft 60 and follows rotational movement of the rotary shaft 60 in a shaft circumferential direction; and a fixed ring 63 which is coaxially mounted on the outer periphery of the rotary shaft 60 in a state where the fixed ring 63 is brought into slide contact with the rotary ring 62, and has rotational movement thereof in the shaft circumferential direction of the rotary shaft 60 restricted.

A slide contact portion 64 between the rotary ring 62 and the fixed ring 63 is, as shown in FIG. 8B, formed of: a slide contact surface on a rotary ring 62 side and a slide contact surface on a fixed ring 63 side. Due to such a constitution, a leakage of a fluid body can be suppressed.

This application example is characterized in that at least a part of the slide contact surface on a fixed ring 63 side is formed of a seal member 65 according to this embodiment.

An aqueous lubricant supplied from the aqueous lubricant supply passage 66 shown in FIG. 8A is impregnated into the seal member 65.

In this manner, with the use of the mechanical seal 61 which forms the shaft seal device according to this embodiment, the mechanical seal 61 can realize high liquid tightness and the extremely excellent low friction resistance compared to a conventional mechanical seal.

6. Application Example

Micro Power Generation Unit and Cluster-Type Power Generation Using Micro Power Generation Unit Next, another application example of a seal member and a shaft seal device according to this embodiment is explained. This application example relates to the river flow generation, and is an example which uses a water prevention system using the above-mentioned seal member and a shaft seal device which imitates a natural joint lubrication system.

Recently, the utilization of renewable energy has been accelerated. However, there have been some examples where the utilization of renewable energy has adversely affected the power generation efficiency and an environment.

The inventors of the present invention have made extensive studies on the system for recovering river flow energy or tidal flow energy with high efficiency while minimizing an adverse effect on the surrounding environment caused by the recovery of river flow energy or tidal flow energy, and have learned a lubrication system of a natural joint in the course of studies, and have succeeded in the development of a waterproofing system which remarkably enhances a low friction/low environment load.

The waterproofing system adopts the structure which uses the above-mentioned sealing member and shaft seal device, introduces a hydrophilic porous material (PVF) as a material of a lip seal portion of a conventional oil seal part, and performs lubrication using a non-Newton aqueous solution (PEG).

In a proof test of a power generation system on which the waterproofing system is mounted, it is confirmed that the seal system effectively functions and hence, the power generation system is explained hereinafter. The power generation system explained hereinafter generates electric power by making use of water flow. As a representative example of the power generation system, the generation of electric power by using the flow of river is given. However, the flow of water is not limited to the flow of river. For example, it is needless to say that electric power is generated using a tidal flow of sea.

As referred previously, a natural joint is an excellent lubrication system which exhibits excellent low friction/low wear property in spite of the fact that the natural joint is exposed to a load and a slide speed which change in a wide range. The lubrication system is formed of: a hydrophilic and porous bearing material (cartilage) which has low elasticity; and a non-Newton aqueous lubricant (joint liquid).

The power generation system according to the application example 3 reproduces this excellent lubrication system from an engineering point of view and is realized by applying the engineeringly reproduced lubrication system to a lubrication part for river flow power generation and tidal flow power generation.

Although a river flow and a tidal flow are stable to some extent, the increase or the decrease of a speed frequently occurs. Further, a leakage of a lubricant leads to the contamination of river or ocean and hence, it is necessary to use a lubricant which is oil-free and exhibits low toxicity.

In view of the above, the inventors of the present invention have learned the system of living thing and have invented the bearing system which remarkably improved a low friction and/or a low environmental load, that is, the seal member and the shaft seal device according to this embodiment. The present invention has been made by applying the lubrication system which imitates the excellent lubrication function of an articular cartilage to the seal member which may be also referred to as a biomimetic seal and the shaft seal device according to this embodiment and hence, the inventors of the present invention call the system as "Bio-Star" by picking up capitals of "Biomimetic System for Tidal flow power generation learned from Articular cartilage".

Figure 9A:
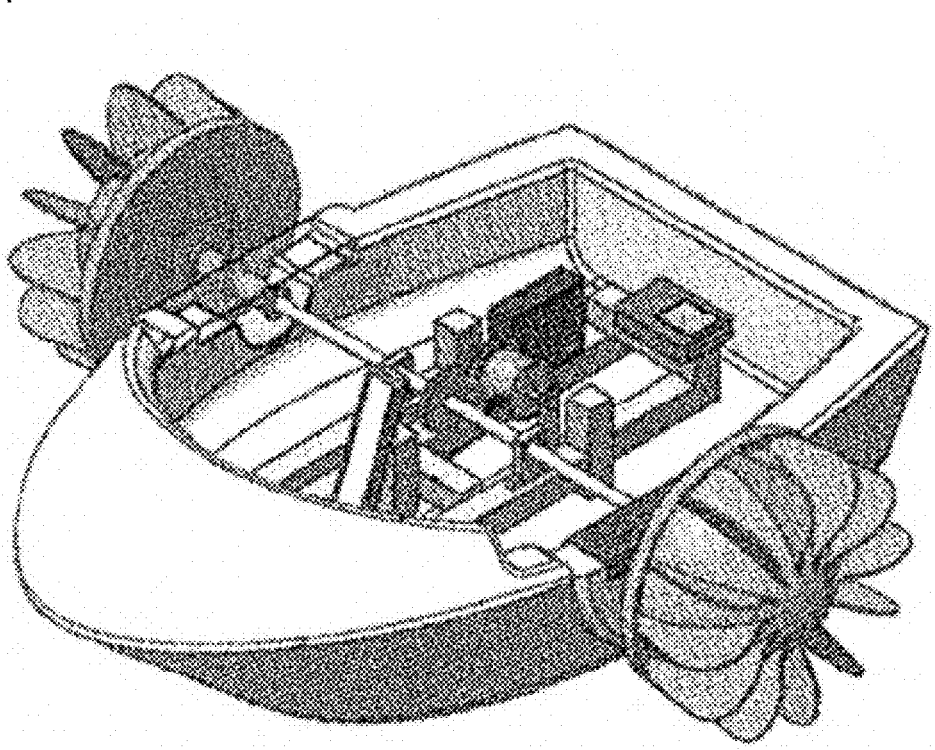
FIG. 9A and FIG. 9B are explanatory views showing the constitution of a power generation device according to an application example 3.
Figure 9B:
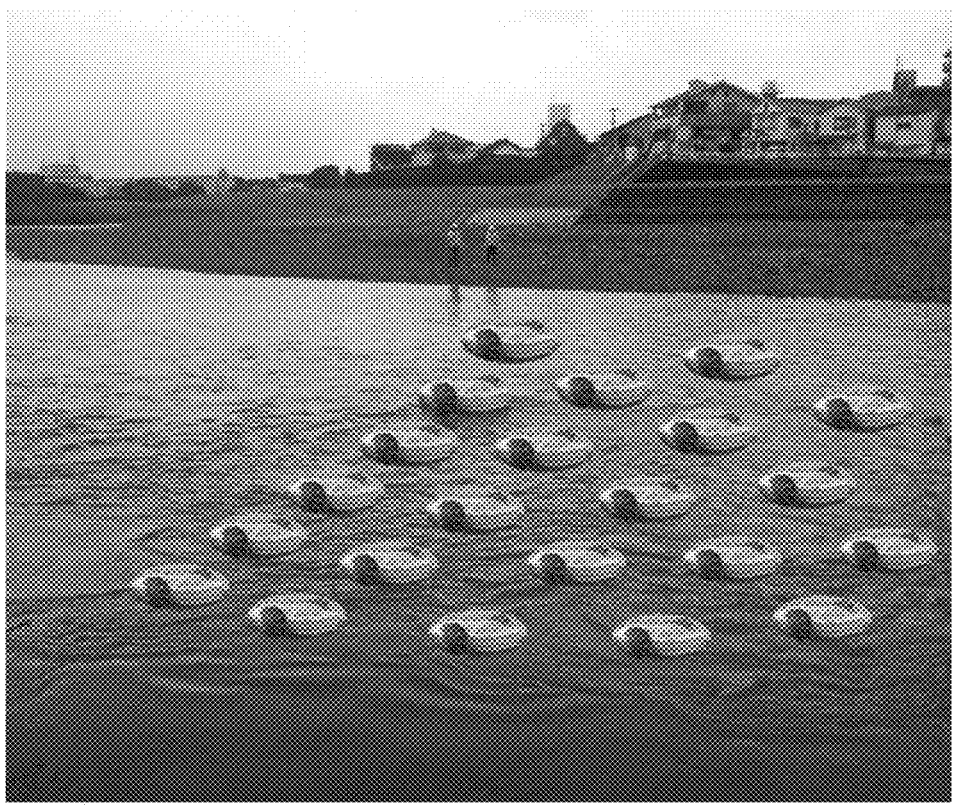

Firstly, FIG. 9A and FIG. 9B show images of a micro power generation unit on which the seal member or the shaft seal device according to this embodiment is mounted and a cluster-type power generation. FIG. 9A is an external appearance perspective view showing the constitution of the micro power generation unit, and FIG. 9B is an image view showing a mode of cluster power generation which uses a plurality of micro power generation units.

As shown in FIG. 9A, the shaft seal device and the seal member according to this embodiment are mounted on bearing portions for supporting a water wheel at two places. Although a dome-shaped cover which closes an upper opening in a watertight manner is not shown in FIG. 9A, a generator and the like weak to moisture are arranged in the inside of a unit having an approximately boat shape, and water tightness of the bearing portion is maintained by the above-mentioned seal member and the shaft seal device. Electric power obtained by a speed-increasing gear and the generator mounted in the unit is taken out and fed to an area on the ground via a power source cable suspended from an anchoring rope. In the cluster-type power generation shown in FIG. 9B, proposed is a mode where power generation is performed by simultaneously installing a plurality of power generation units, wherein each power generation unit is extremely small having a size of 1.2 m×1.2 m and having a weight of 20 kg or less.

The technical features of this mode includes the following technical features. 1) The development and conservation of attached infrastructure such as the infrastructure of a dam and a road around the dam is unnecessary and hence, the cluster-type power generation can be installed in any place provided that there is the flow of water. 2) The cluster-type power generation can be easily removed when heavy rain or the like is expected. 3) Even when a defect occurs in one unit, an effect that the defect exerts on the total power generation is small.

7. Application Example 4

Application in the Form of Water Proof System Applied to Power Generation Device The unit shown in FIG. 9A and FIG. 9B enables the power generation in an extremely sallow river. On the other hand, the unit makes use of the water wheel and hence, it is not always the case where power of river flow can be efficiently recovered.

Figure 10A:
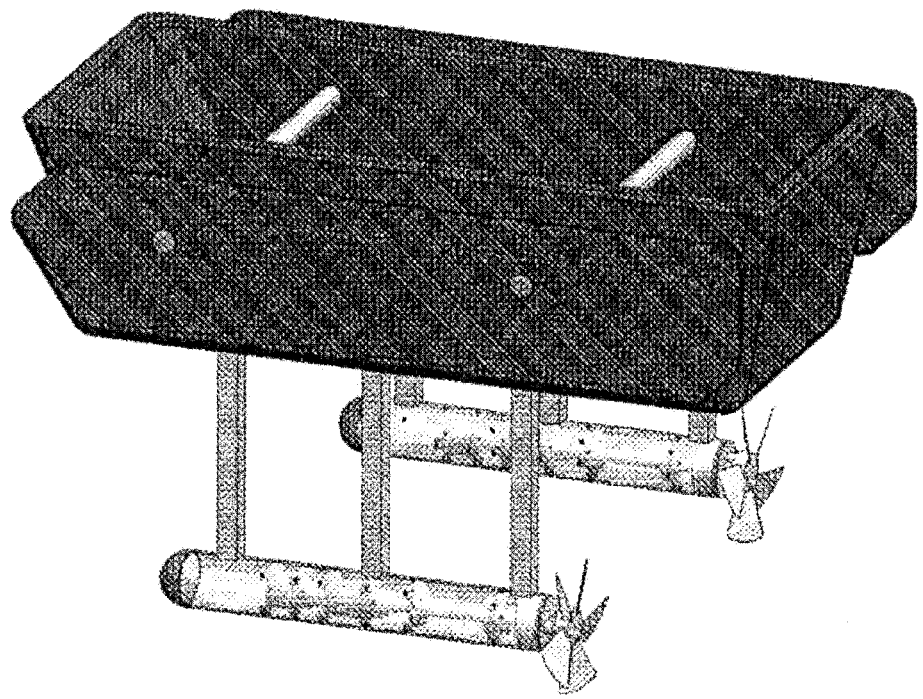
FIG. 10A and FIG. 10B are explanatory views showing the constitution of the power generation device according to an application example 4.
Figure 10B:
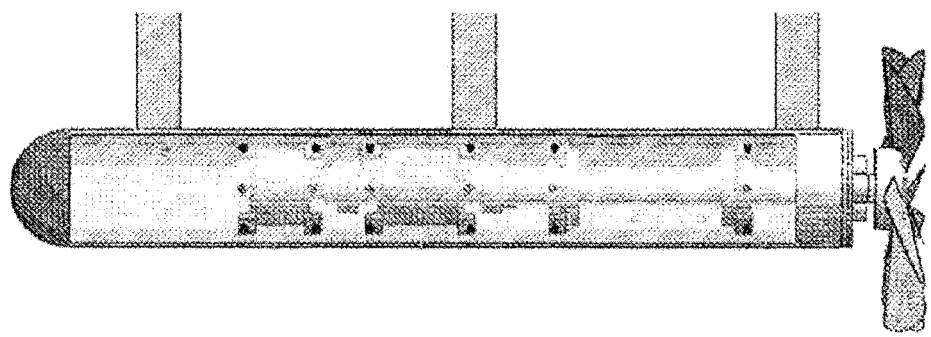

In view of such, a case, the inventors of the present invention have carried out the development of a power generation system shown in FIG. 10A and FIG. 10B where a turbine (propeller) is completely immersed in water. FIG. 10A is a perspective view showing the external appearance of the power generation system, and FIG. 10B is an explanatory view showing the constitution of a power generation mechanism part of the power generation system.

The technical features of the powered generation system according to this application example 4 is the layout structure where ail of the turbine, a speed-increasing gear and a generator are arranged underwater in a straight line in this order for reducing a mechanical loss in a power transmission system such as gears.

What must be taken into an account in the layout structure is a water proof seal. The task lays in that, while the rotating turbine and a shaft which is connected to the turbine are exposed underwater, the generator which takes out electric power by the shaft and equipment around the generator require waterproofing.

As described previously, a part which plays a role of waterproofing is referred to as an oil seal or a mechanical seal, and is a product indispensable as a seal device of a machine in various fields.

Figure 11:
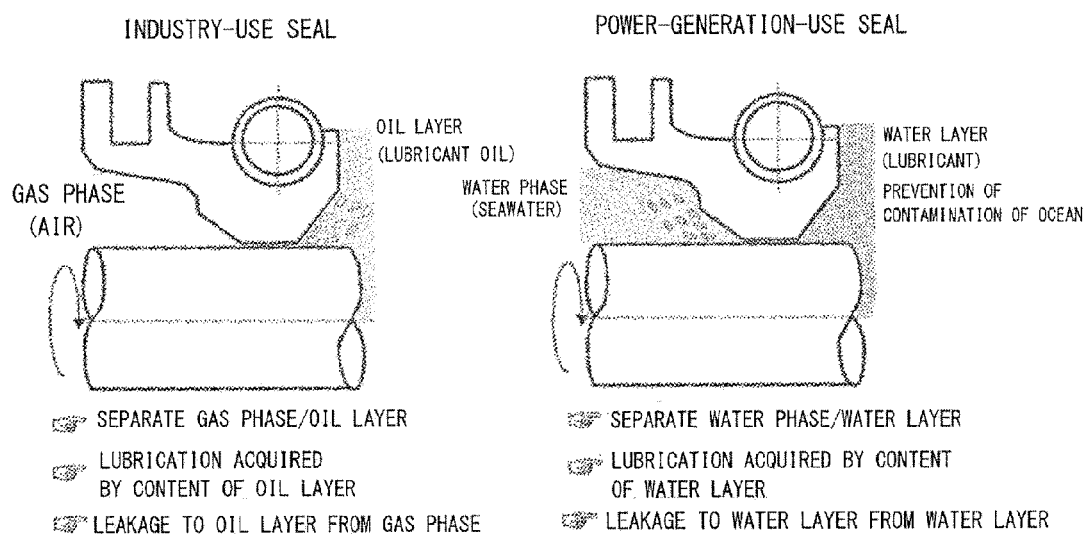
FIG. 11 is an explanatory view showing a difference between a conventional oil seal and a seal required in a power generation system according to an application example 4 of the present invention.

FIG. 11 shows the difference between an existing oil seal and a seal which is required by the power generation system according to the application example 4. The existing oil seal shown on the left side in FIG. 11 uses a rubber-based material for forming a lip seal portion, and plays a role of separating a gas phase and an oil layer. While enabling the lubrication of a contact portion between the lip seal and the shaft by making use of the content of the oil layer, a leakage of a lubricant to the oil layer from gas phase is permitted to prevent a leakage of a lubricant to the gas phase from the oil layer.

On the other hand, in the seal required by the power generation system according to the application example 4, a water soluble lubricant of a low environmental load should be used for preventing environmental contamination caused by a leakage of the lubricant. In this case, it is necessary to separate a water layer (river water or sea water) and a water layer (lubricant) from each other.

Further, from a view point of waterproofing, a leakage to the water layer (lubricant) from the water layer (river water or seawater) is not permissible. That is, it is apparent that the seal required by the power generation system according to the application example 4 must be a seal having a function different form a function of a conventional seal.

Then, a lip seal and a lubricant used in the power generation system according to the application example 4 are referred.

Figure 12:
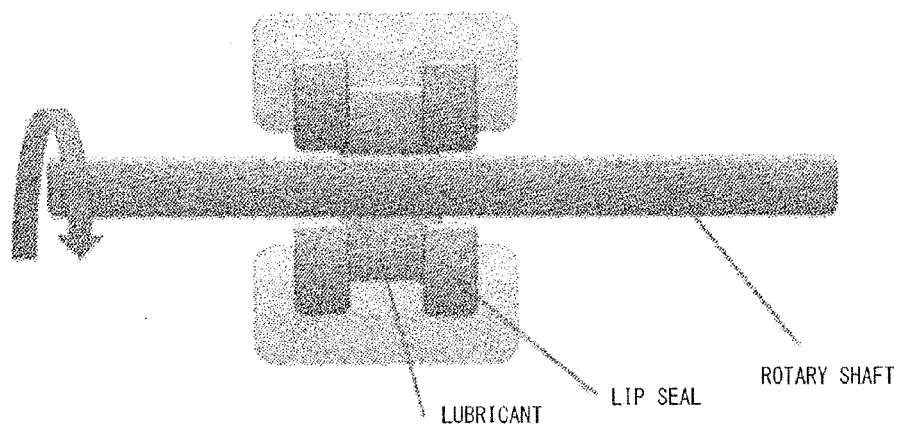
FIG. 12 is an explanatory view showing a concept of a seal system developed in the power generation system according to the application example 4.

FIG. 12 is a conceptual view of a seal system developed in the power generation system according to the application example 4. The seal system adopts the structure where two lip seals are arranged and a lubricant is stored between the lip seals for separating water layer (river water or seawater), a water layer (lubricant) and a gas phase (a space in the inside of a power generation device from each other.

A material for forming a lip seal is not a conventional rubber-based material, but is a material which imitates a bio articular cartilage. That is, the seal member according to this embodiment is used.

An articular cartilage is a continuous porous body made of collagen fibers and having low elasticity, and glycoprotein (glycoprotein composite) which is a lubricant component exists in the inside of the articular cartilage. When cartilages are brought into direct contact with each other, the cartilage is deformed and, at the same time, a lubricant component exudes thus alleviating a direct contact state.

As a material which reproduces such a cartilage function, employed is a seal member according to this embodiment which uses the above-mentioned formalized polyvinyl alcohol (polyvinyl formal: PVF).

Figure 13:
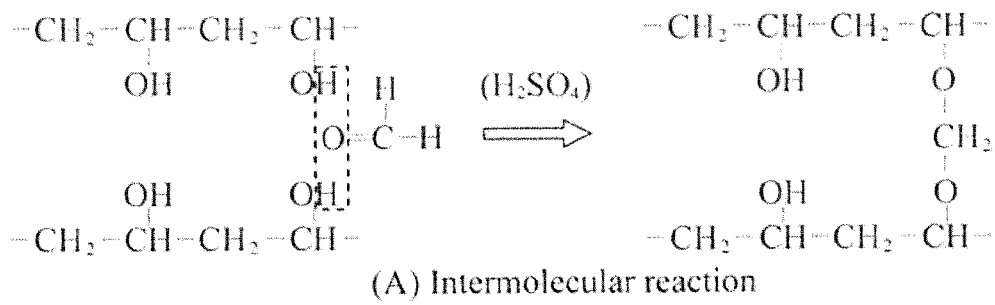
FIG. 13 is an explanatory view showing a forming process of PVF.
Figure 13:
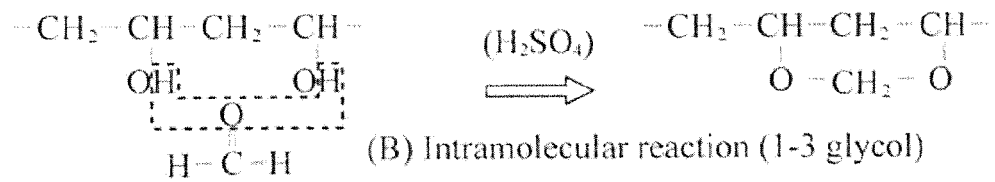
Figure 13:
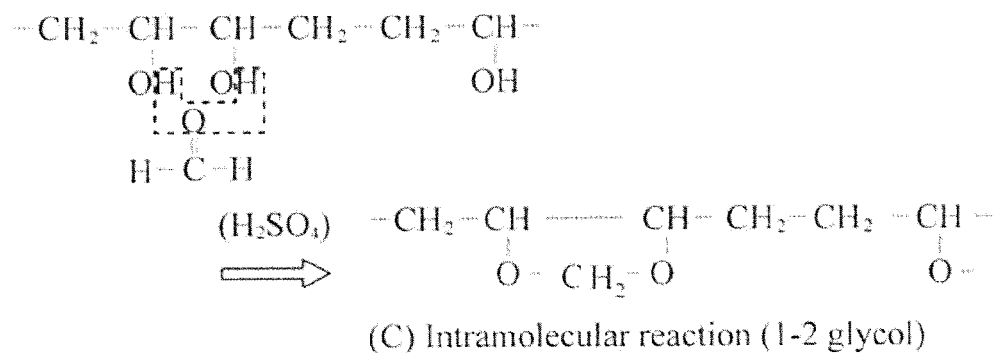
Figure 14:
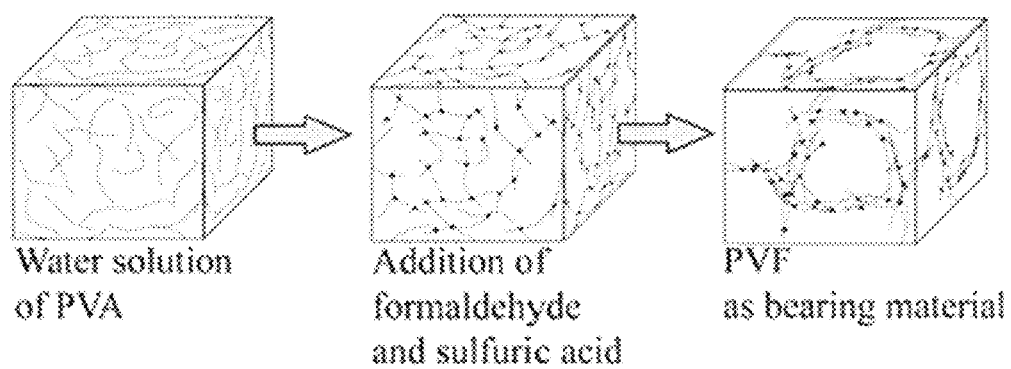
FIG. 14 is an explanatory view showing the forming process of PVF.

A production process of PVF is shown in FIG. 13 and FIG. 14. When polyvinyl alcohol is formalized by formaldehyde (HCHO) together with an acid catalyst such as a sulfuric acid ($H_2SO_4$), polyvinyl alcohol changes to a substance to which waterproof property is given and which exhibits excellent mechanical properties and chemical resistance. In an actual formalization, an intermolecular formal which reacts between molecules, and in-molecule formal which reacts in 1-3 or in 1-2 glycol are formed in a mixed form. Accordingly, substances obtained by the process are copolymer substances where an alcohol hydroxyl group, an acetyl group and a formal group are mixed (see FIG. 13).

In polyvinyl alcohol dissolved in water, as the formalization between molecules progresses, the number of cross-linking portions between polymer molecular main chains is increased (see FIG. 14). Further, the formalization in each one molecule also progresses and hence, polymer main chains are changed to substances insoluble to water. However, an alcohol hydroxyl group which do not contribute to the reaction remains and hence, the hydrophilicity is maintained. In this process, the elimination of water which was a solvent for polyvinyl alcohol progresses and hence, main chains coagulate by an intermolecular force or the like whereby beams and bubbles appear. A substance which is produced in such a process is hydrophilic and possesses porous structure formed of the continuous porous body and hence, the substance is likely to exhibit the same properties as an articular cartilage. A material property and a lubrication property of the lip seal is determined based on the mutual relationship between a state of beams and a state of bubbles shown in FIG. 14.

Figure 15:
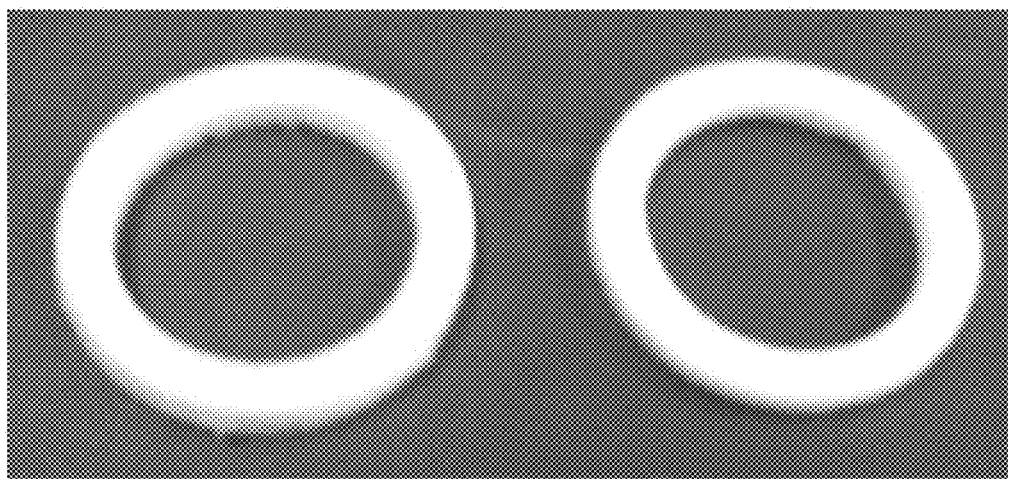
FIG. 15 is an explanatory view showing a PVF lip seal adopted in a waterproofing system of the power generation system according the application example 4.

A PVF lip seal adopted by the waterproof system (the shaft seal device and the seal member) of the power generation system according to the application example 4 is shown in FIG. 15. A reaction liquid having fluidity immediately after a chemical reaction starts is poured into a PTFE-made mold, and a lip seal is taken out from the mold after the reaction is completed. A lip seal is formed where a PVF pore diameter is set to 5 μm, and the lip seal has an outer diameter of 40 mm, an inner diameter of 30 mm, and a thickness of 5 mm.

Figure 16:
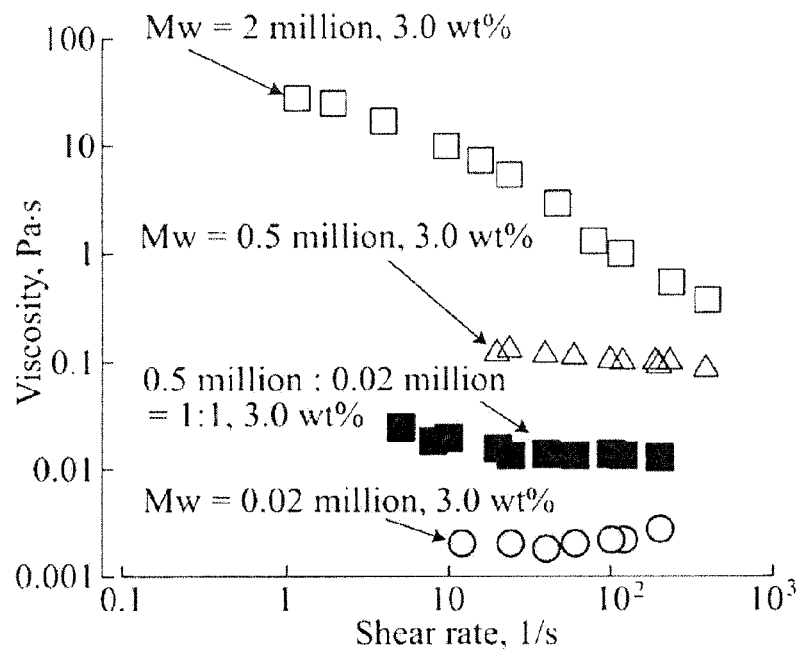
FIG. 16 is a graph showing natures of respective lubricating liquids.

Further, to imitate an articular liquid of a human body, a polyethylene glycol (PEG) is adopted as a lubricant (see FIG. 16). A PEG aqueous solution is, in the same manner as an articular liquid, a non-Newton fluid where viscosity is lowered along with the increase of a shearing speed.

In the shaft seal device mounted on the micro power generation unit described in the previously mentioned application example 3 (see FIG. 9A and FIG. 9B), to enhance starting friction property and steady-state friction property, a mixed PEG acquis solution having a molecular weight of 20,000 and a molecular weight of 500,000 (weight ratio is 1:1, 3.0 wt %) is used as a lubricant. However, it has become apparent by a preparatory test carried out by the inventors of the present invention that, to strengthen a waterproofing function, it is desirable to assign priority on sealing property due to high viscosity even when the shaft seal device receives shearing resistance due to high viscosity of a lubricant. Accordingly, in the shaft seal device of the power generation system according to the application example 4, a 3.0 wt % aqueous solution having a molecular weight of 2,000,000 is used as a lubricant.

Then, a torque friction test and a field test were carried out with respect to the power generation system having the shaft seal device provided with those constitutions.

Figure 17:
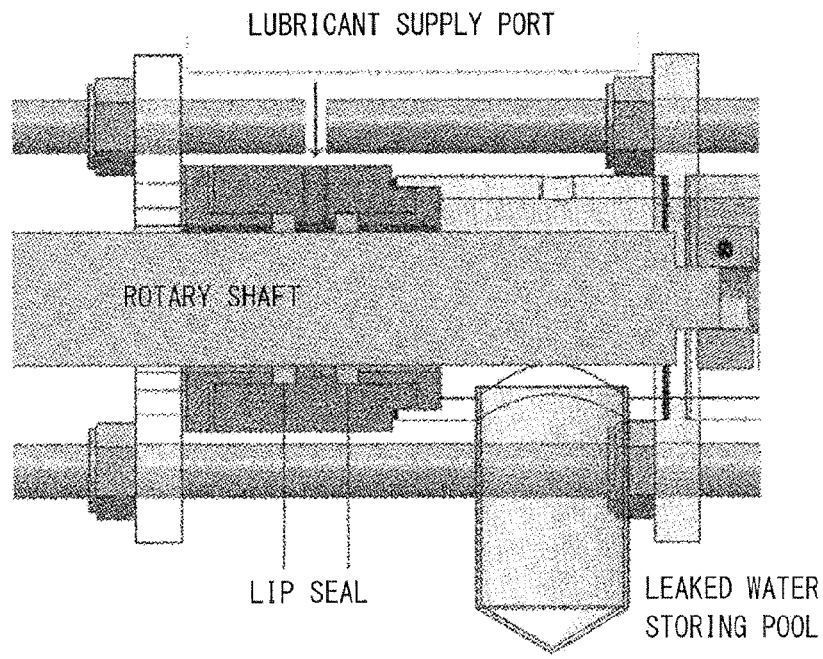
FIG. 17 is an explanatory view showing the constitution of an essential part of a torque friction testing device.
Figure 18:
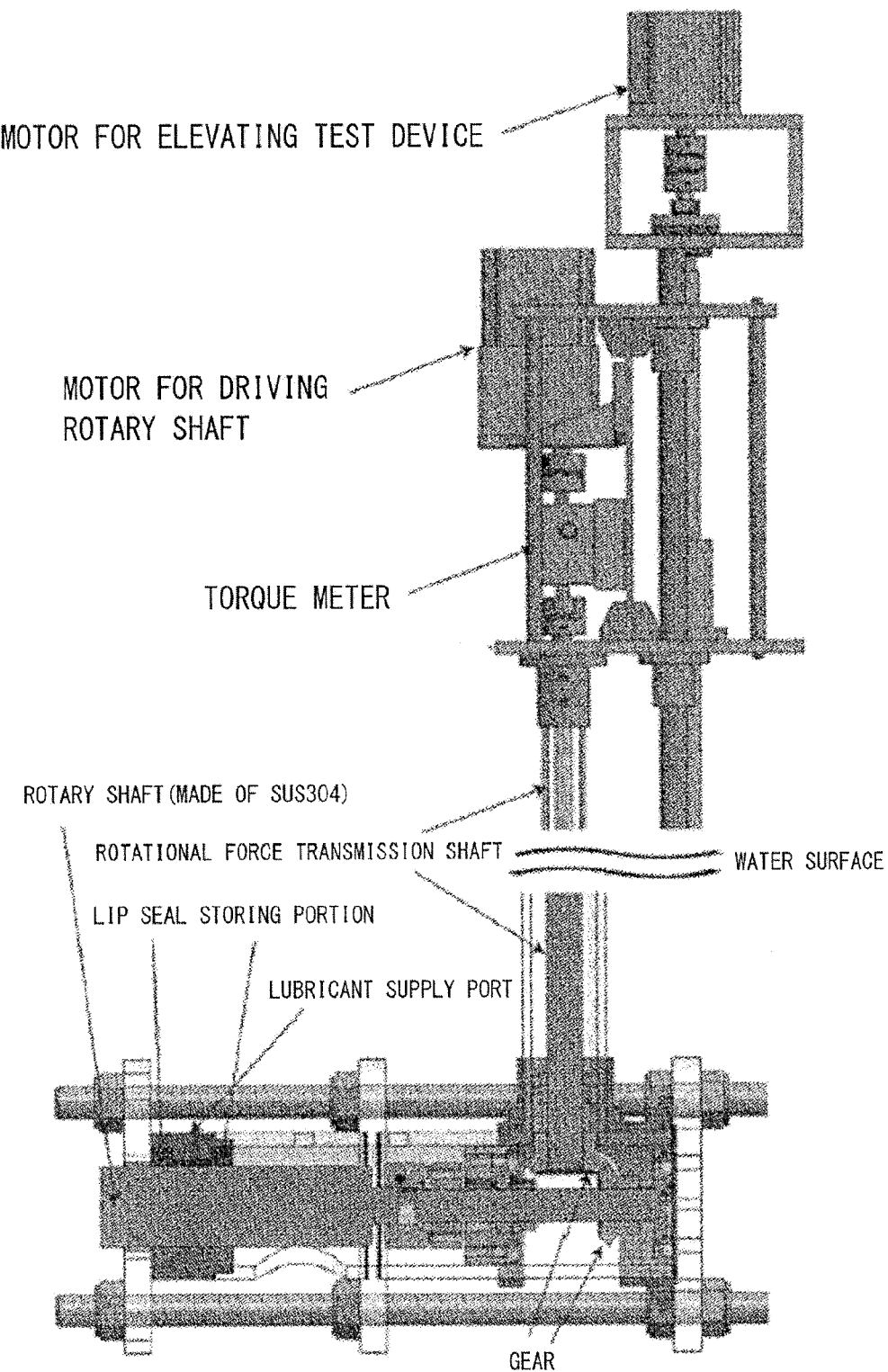
FIG. 18 is an explanatory view showing the constitution of the essential part of the torque friction testing device.

The torque friction test was carried out by mounting the above-mentioned shaft seal device on a torque friction test device (see FIG. 17 and FIG. 18) having the substantially same constitution as the test device previously shown in FIG. 1 to FIG. 3B.

Figure 19:
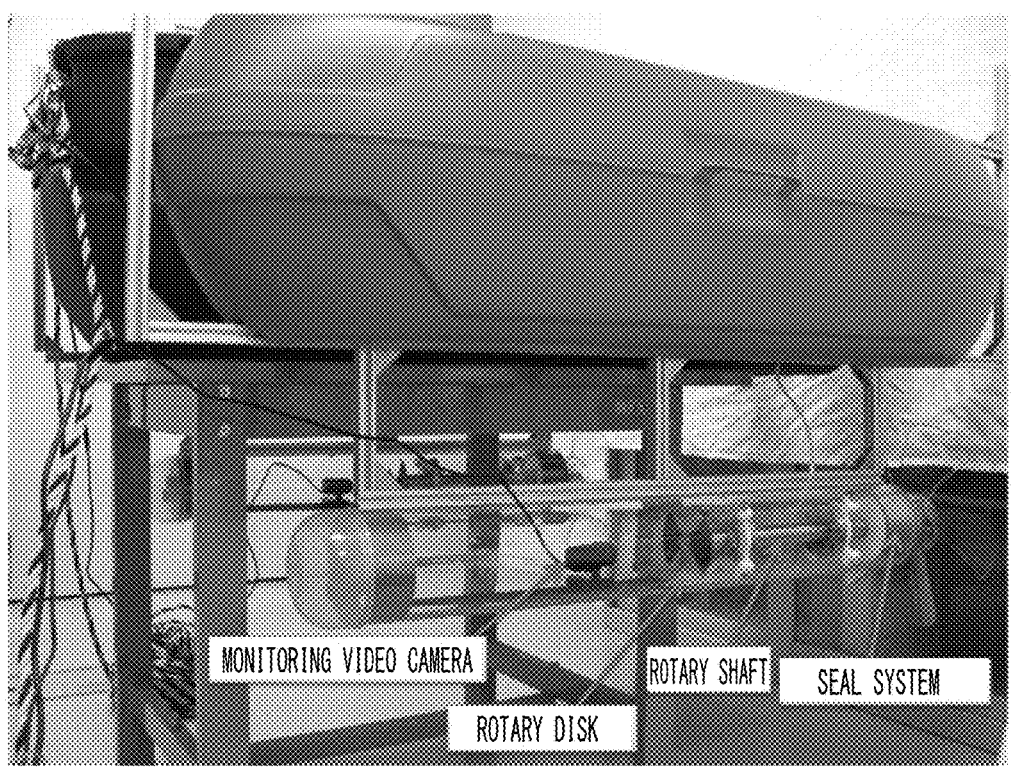
FIG. 19 is an explanatory view showing an external appearance of a power generation unit used in a field test.

The field test was carried out by a power generation unit prepared based on the explanatory view shown in FIG. 10A and FIG. 10B previously. The external appearance of the power generation unit used in the field test is shown in FIG. 19. In the power generation unit, priority is assigned to the evaluation of a friction torque and a waterproofing performance of a seal system. Accordingly, the power generation unit is designed such that a power generator and the like can be assembled into the power generation unit later. Out of two sets of power generation units, the developed seal system is mounted on one power generation unit, and an existing oil seal (AE1709A made by NOK Corporation) is mounted on the other one set of power generation unit. A rotary disk was mounted at an end point of a rotary shaft, and a rotational state of the rotary shaft was observed and recorded on the ground by a video camera.

Shirakawa (Kumamoto city in Kumamoto prefecture) which is a class A river system was selected as a location for a demonstration test, and a rotational state and a waterproofing function of the rotary shaft in an actual river flow were evaluated.

Figure 20:
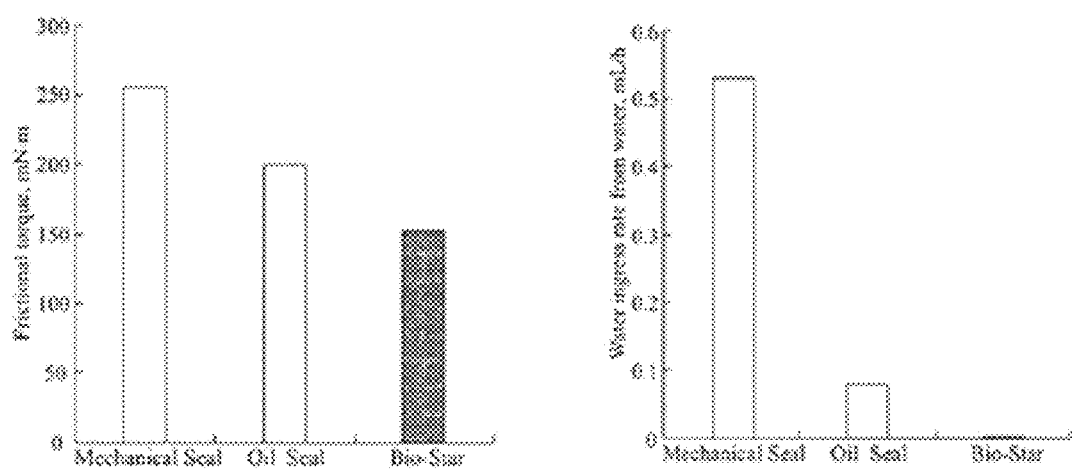
FIG. 20 is an explanatory view showing a result of a friction torque and water leakage suppression performance in each seal system.

Firstly, a result of a friction torque and a water leakage performance in respective seal systems obtained by the torque friction test is shown in FIG. 20. It was proved that the seal member and the shaft seal device used in the application example 4 can rotate the shaft in a state where a friction torque is smaller than a friction torque of an existing oil seal by 25% or more.

Further, a leakage water amount became a detection limit or less (0.01 mL/h or less) and hence, it was proved that the seal member and the shaft seal device used in the application example 4 have excellent water proofing property compared to the existing oil seal. It was confirmed that the consumption of the lubricant becomes minimum by installing a lubricant reservoir at the same level as a water level at this point of the time.

Figure 21:
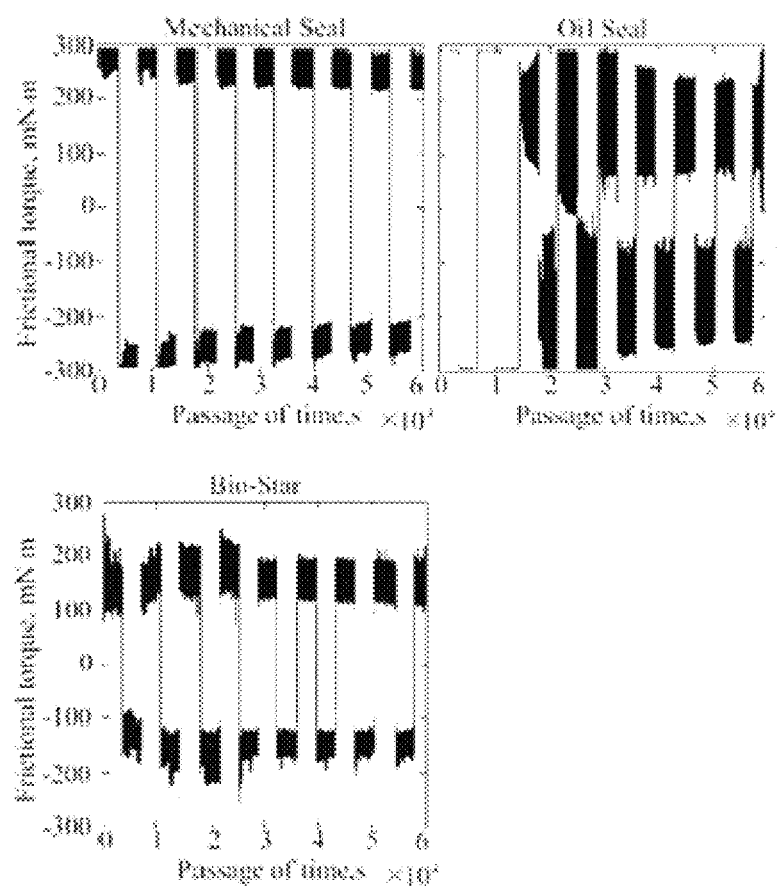
FIG. 21 is an explanatory view showing a change in time of the friction torque in each seal system.

FIG. 21 shows the transmission with time of friction torques in the respective seal systems. In the mechanical seal, although a change in friction torque was small, a value of the friction torque was large and exceeded a measurement limit value (300 mN·m) of a torque meter. Although a friction torque of the oil seal was smaller than a friction torque of the mechanical seal, a change in torque was large. It was considered that stick-slip occurred between rubber and metal due to water lubrication. It became apparent that a change in friction torque of the seal member and the shaft seal device used in the application example 4 is small in the same manner as the mechanical seal, and a value of the friction torque is smaller than a value of a friction torque of the oil seal.

Figure 22:
FIG. 22 is an explanatory view showing circumstances of the field test.
Figure 23A:
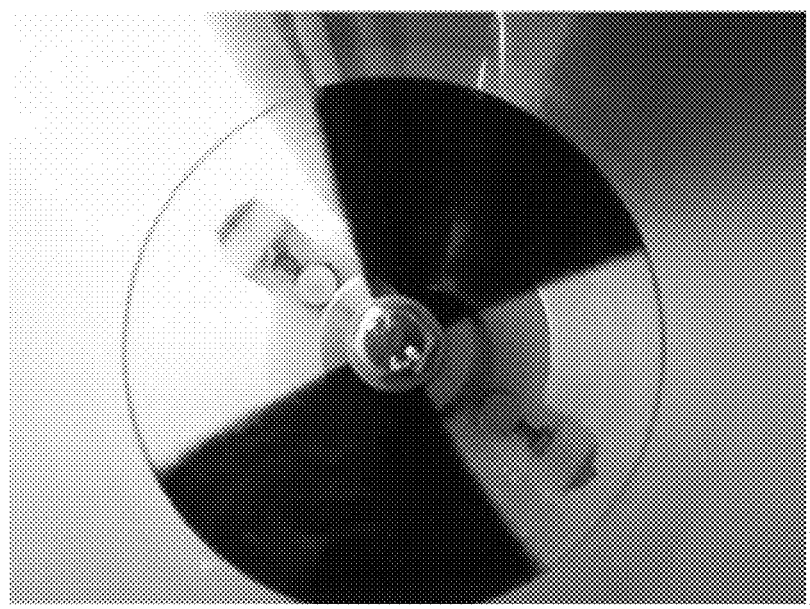
FIG. 23A is an explanatory view showing a state of rotary disk observed from the inside of an underwater power generation unit.
Figure 23B:
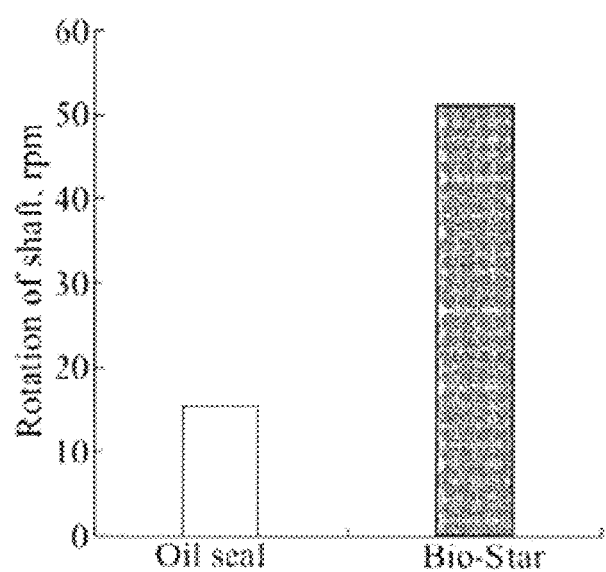
FIG. 23B is an explanatory view showing an average rotational speed of the rotary disk.

Next, the mode of a field test is shown in FIG. 22, and a state of a rotary disk as viewed from the inside of the power generation unit underwater is shown in FIG. 23A. Further, an average rotational speed of the rotary disk in the demonstration test is shown in FIG. 23B. It was confirmed that a friction torque of the seal member and the shaft seal device used in the application example 4 is extremely low also in the actual use of the seal member and the shaft seal device in river, and a rotational speed which is approximately 3.3 times as large as a rotational speed when the oil seal is used can be acquired.

In this manner, according to the power generation system of the application example 4, also underwater, the intrusion of water can be prevented as much as possible, and efficient power generation can be performed.

Figure 24A:
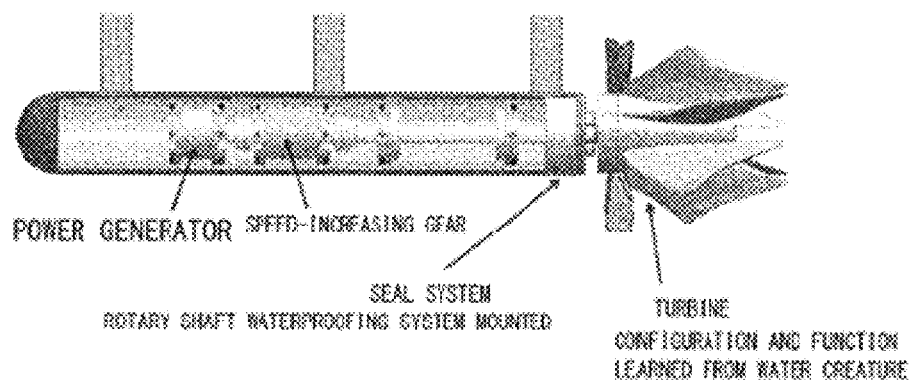
FIG. 24A is an explanatory view showing the constitution of the underwater power generation unit.

The underwater power generation unit arranged underwater may have the constitution shown in FIG. 24A, for example. That is, a turbine arranged on a rear side of a watertight cylindrical body by way of the shaft seal device according to this embodiment may be formed into a shape formed by applying the configuration of a water creature as shown in the FIG. 24A.

Figure 24B:
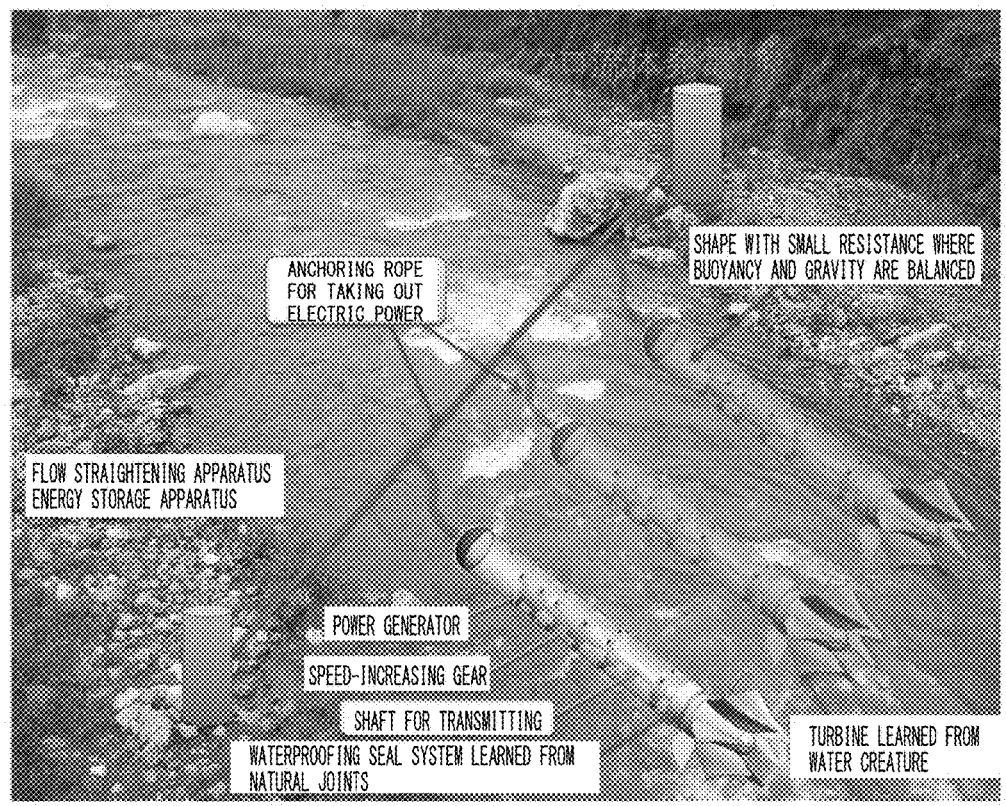
FIG. 24B is an explanatory view showing a use state of the underwater power generation unit.

The underwater power generation unit formed in this manner may be placed in flow of water in an anchored state as shown in FIG. 24B, and electric power obtained from the underwater power generation unit via an electricity supply cable arranged along an anchoring rope may be collected by battery, for example.

8. Application Example

Application to Floatable Power Generation Device

Figure 25:
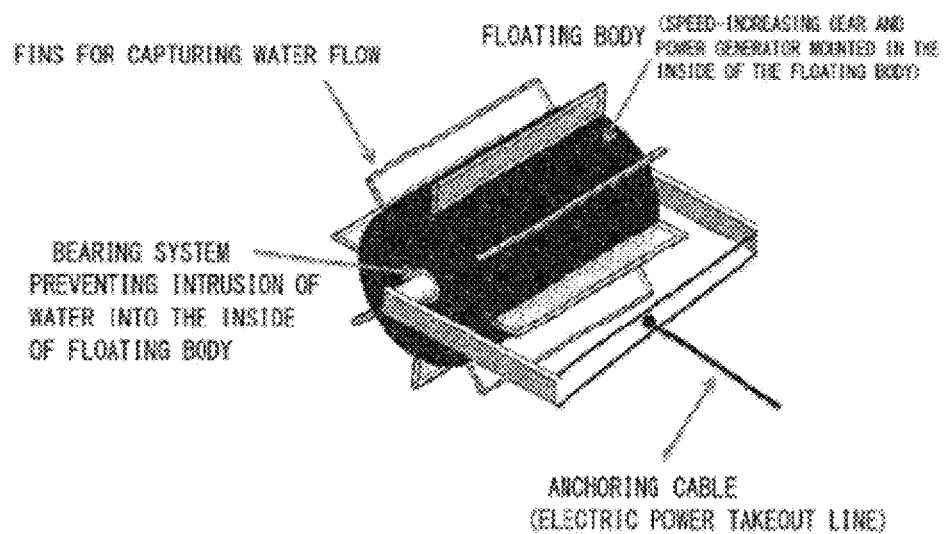
FIG. 25 is an explanatory view showing an external appearance of a floatable power generation device.
Figure 26:
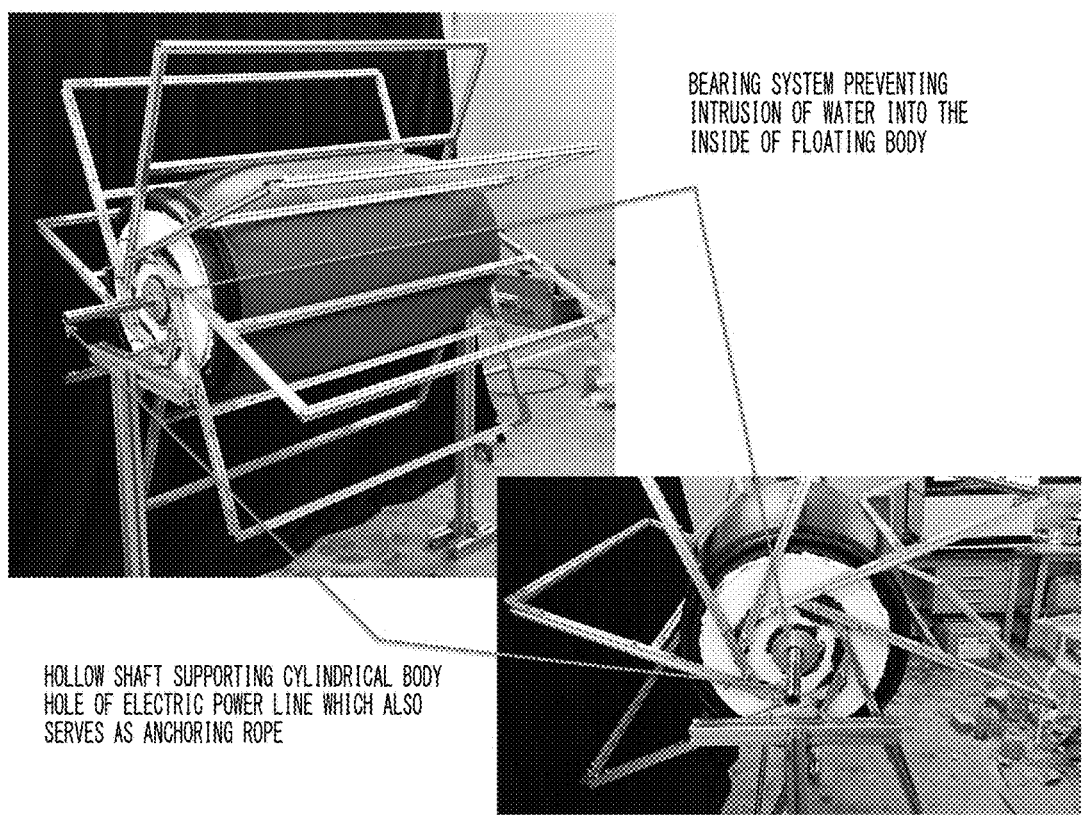
FIG. 26 is an explanatory view showing the constitution of a part of the floatable power generation device.

Firstly, the external appearance of a power generation device according to the application example 5 is shown in FIG. 25 and FIG. 26. FIG. 25 is an explanatory view showing the external appearance of the floatable power generation device according to the application example 5, and FIG. 26 is an explanatory view showing the constitution of a part of the power generation device.

As shown in FIG. 25 and FIG. 26, the power generation device according to the application example 5 is a power generation device where a plurality of fins are mounted on a cylindrical body, the cylindrical body per se becomes a floating body, and electric power is generated due to a rotational force of the cylindrical body.

In the power generation device, a speed-increasing gear and a power generator are mounted in the inside of the cylindrical body, and the power generator is anchored in river or a tidal flow by way of a hollow shaft which supports the cylindrical body, and electric power is taken out through the hollow shaft. To realize the structural body of the power generation device according to the application example 5, the seal member and the shaft seal device according to this embodiment described above is applied.

As a result of the extensive study of the inventors of the present invention relating to river flow/tidal flow power generation, important points for realizing a more practical power generation device has become apparent. To prevent an accident or a failure, it is important to apply a waterproofing counter measure to a power generator from which electric power is taken out and the equipment around the generator. It must be noted that an energy recovery loss occurs depending on a design of such portions (a design of parts).

With use of the shaft seal device and the seal member of a low energy loss according to this embodiment, as explained previously, the inventors of the present invention have carried out the demonstration test with respect to the application of the shaft seal device and the seal member to a water-wheel-type micro and cluster power generation system (see FIG. 9A and FIG. 9B and the application example 3) and an all-in-one power generation unit (see FIG. 19 and the like and the application example 4) capable of recovering energy even from a river flow or a tidal flow.

However, in the water-wheel-type micro power generation system referred in the application example 3, a fluid resistance which the boat-shaped float portion receives is added to a load of the anchoring rope, and energy cannot be recovered from such a portion. Further, in the all-in-one power generation unit referred in the application example 4, electric power cannot be generated unless a water depth of a certain extent assured.

The power generation device according to the application example 5 shown in FIG. 25 and FIG. 26 has been developed in view of such circumstances. The power generation device according to the application example 5 is characterized by being a self-contained device where, with the use of the seal member and the shaft seal device according to this embodiment, a speed-increasing gear and a power generator can be assembled into the inside of a cylindrical body, an affiliated construction work becomes unnecessary, and energy can be recovered by a power line which also functions as the anchoring rope.

Figure 27A:
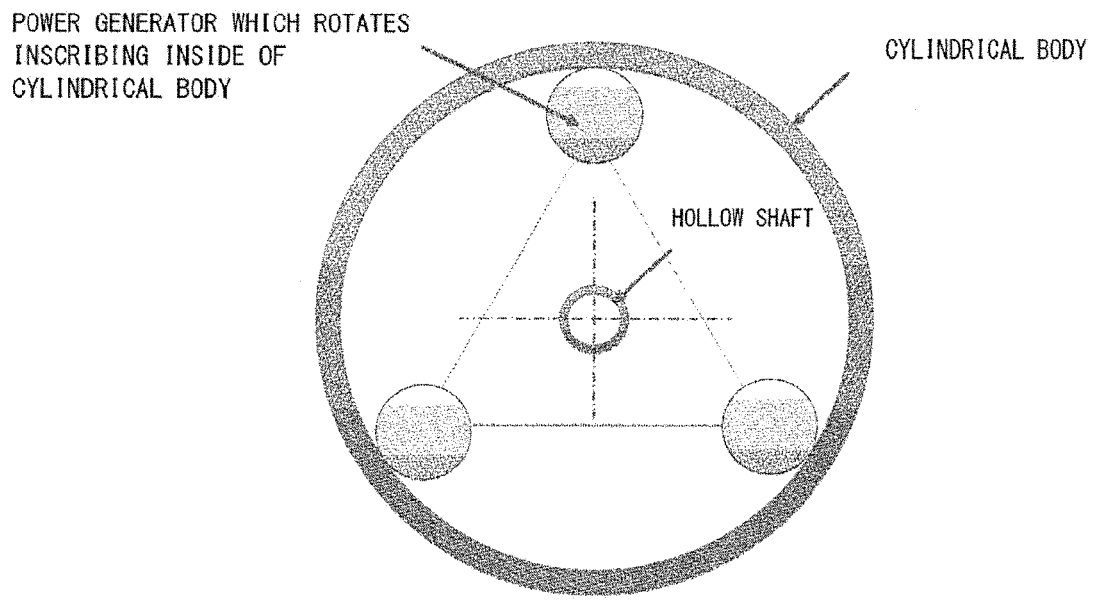
FIG. 27A and FIG. 27B are a schematic view of the internal structure of a power generation device according to an application example 5.
Figure 27B:
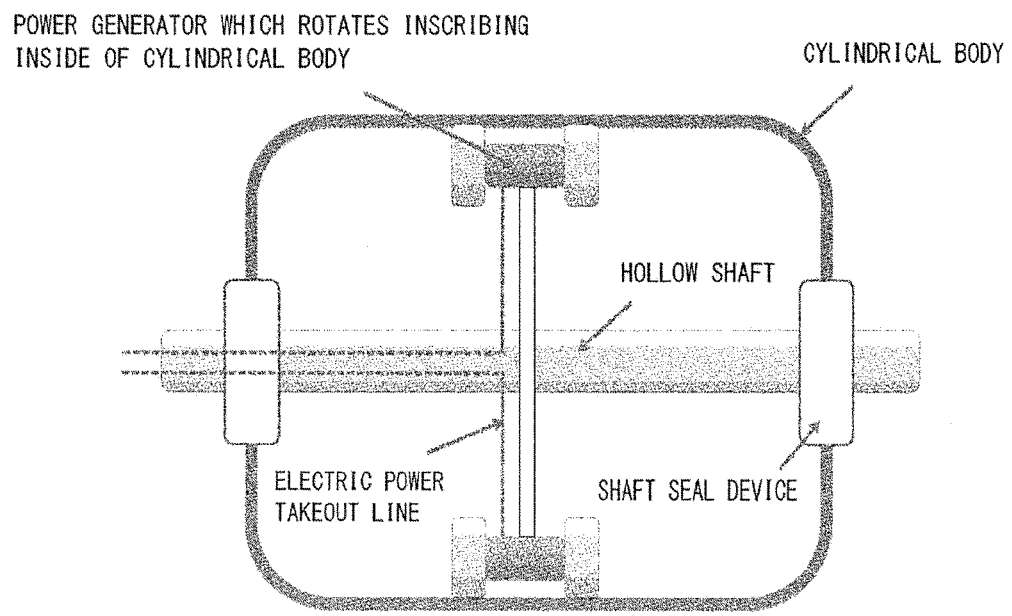

FIG. 27A and FIG. 27B are conceptual views of the internal structure of the power generation device according to the application example 5. FIG. 27A is an explanatory view showing a cross section in the direction orthogonal an axis of the power generation device, and FIG. 27B is an explanatory view showing a cross section in the axial direction. As can be also understood from FIG. 27A and FIG. 27B, the power generation device according to the application example 5 is configured such that a hollow fixed shaft is formed in an inserted manner between approximately center positions of a pair of opposite flat surfaces of an outer cylindrical body, and the shaft seal device according to this embodiment is arranged in the in fixed-shaft inserting portions of the flat surfaces thus preventing the intrusion of water into the inside of the cylindrical body.

In the inside of the cylindrical body, three power generators each of which generates electric power by being rotated while being brought into contact with an inner peripheral wall of the cylindrical body are provided. The power generators are connected to the fixed shaft by way of an approximately triangular support plate. AS shown in FIG. 25 and FIG. 26, when a water flow impinges on fins for capturing a water flow which are arranged an outside the cylindrical body so that the cylindrical body is rotated relative to the fixed shaft, slide contact rollers provided to the power generators arranged on the fixed shaft by way of the support plate are rotated so that electric power generated by the power generators is taken out via power takeout lines.

In this manner, according to the shaft seal device and the seal member of this embodiment, it is possible to realize the floating-type power generation device according to the application example 5.

9. Application Example 6

Application to the Floatable Power Generation Device

Figure 28:
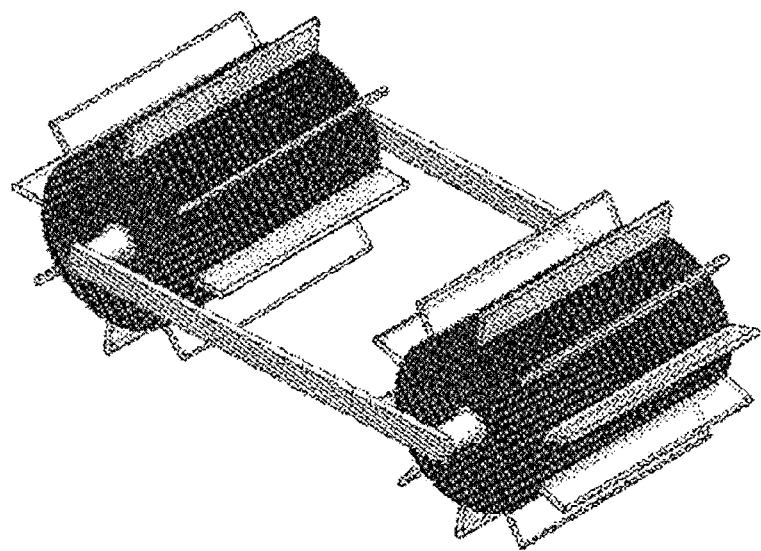
FIG. 28 is an explanatory view showing the constitution of a power generation device according to an application example 6.

Next, a modification of the power generation device explained in conjunction with the application example 5 is explained as the application example 6. The constitution of the power generation device according to the application example 6 is shown in FIG. 28.

The power generation device according to the application example 6 includes two sets of power generation devices according to the application example 5 described previously, and two frames extend between the fixed shafts of two sets of power generation devices. The power generation device according to such an application example 6 may be also referred to as a derived-mode power generation device formed by making use of the technical feature of the power generation device according to the application example 6 that the power generation device is a self-contained device which become a float by itself.

10. Application Example 7

Figure 29:
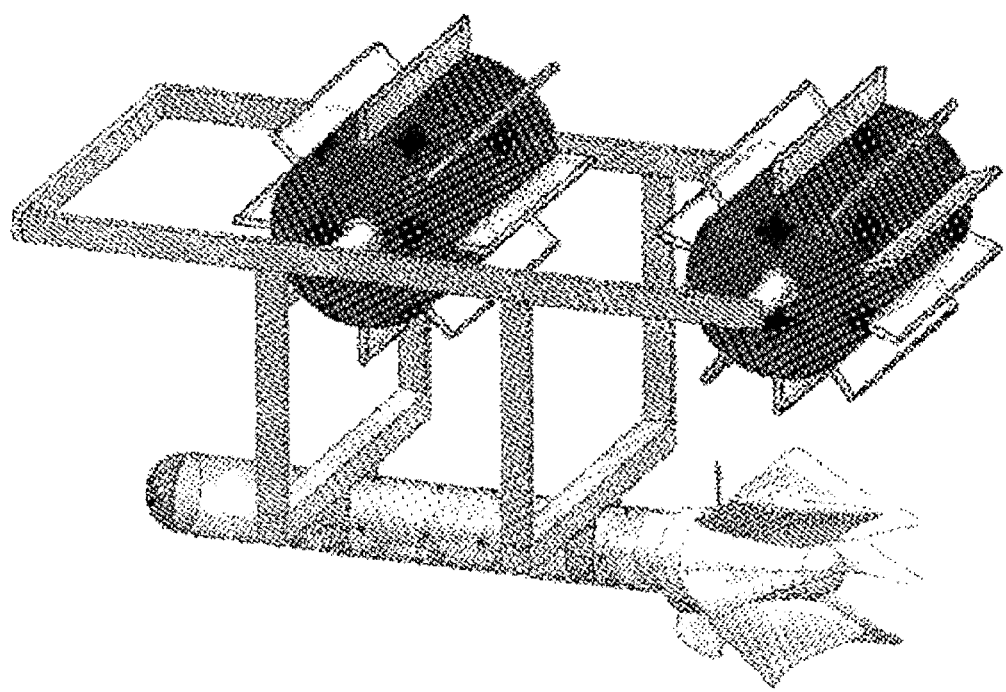
FIG. 29 is an explanatory view showing the constitution of a power generation device according to an application example 7.

Application to Power Generation Device which can Generate Electric Power Using Water Flow on Water Surface and Underwater Water Flow Next, a further modification of the power generation device explained in conjunction with the application example 6 is explained as the application example 7. The constitution of the power generation device according to the application example 7 is shown in FIG. 29.

The power generation device according to the application example 7 is configured such that the underwater power generation unit which constitutes the hydraulic power generation device according to the embodiment shown in FIG. 24A and the like according to the application example 4 is provided below the power generation device according to the application example 6 described previously.

Also due to such constitution, it is possible to realize a derived-mode power generation device formed by making use of the technical feature of the power generation device according to the application example 6 that the power generation device is a self-contained device which become a float by itself.

As has been described heretofore, according to the shaft seal device of this embodiment, in the shaft seal device which is arranged around the periphery of the shaft which is supported in a rotatable manner or in a reciprocating manner, and is provided with the seal member for securing liquid tightness around the shaft, the seal member is formed of a porous body formed by using a hydrophilic polymer resin in which chains are cross-linked. Accordingly, it is possible to provide the shaft seal device provided with the seal member which possesses excellent liquid tightness, small friction resistance and high wear resistance.

Finally, the above-mentioned respective embodiments merely explain one example of the present invention, and the present invention is not limited by the above-mentioned embodiments. Accordingly, it is needless to say that provided that embodiments other than the above-mentioned respective embodiments do not depart from the technical concept of the present invention, various modifications are conceivable corresponding to designs.

EXPLANATION OF SYMBOLS

28: seal member
30: drive shaft
50: force receiving shaft
53: seal member
56: power generator housing portion
57: lubricant supply port
58: aqueous lubricant supply pipe
60: rotary shaft
61: mechanical seal
62: rotary ring
63: fixed ring
64: slide contact portion
65: seal member
66: aqueous lubricant supply passage
A: seal member
B: seal member
C: shaft seal device
F: shaft seal device
X: aqueous lubricant
Y: aqueous lubricant

The invention claimed is:

1. A shaft seal device which is arranged around the periphery of a shaft which is supported in a rotatable manner or in a reciprocating manner, and is provided with a seal member for securing liquid tightness around the shaft, wherein
the seal member comprises a porous body comprised of a hydrophilic polymer resin in which chains are cross-linked and the hydrophilic polymer of the hydrophilic polymer resin is polyvinyl formal in which chains of polyvinyl alcohol are cross-lined by formaldehyde, and
an aqueous lubricant, which is prepared by adding polyethylene glycol to an aqueous solvent, is impregnated into the seal member.

2. The shaft seal device according to claim 1, wherein the shaft is a shaft which extends between a liquid phase region and a gas phase region, and the seal member is a seal member which suppresses a leakage of a liquid to the gas phase region from the liquid phase region.

3. The shaft seal device according to claim 1, wherein the shaft is a shaft which extends between a first liquid phase region present on one end side of the shaft and a second liquid phase region present on the other end side of the shaft, and the seal member suppresses the communication of a liquid between the first liquid phase region and the second liquid phase region.

4. The shaft seal device according to any one of claims 1 to 3, wherein the seal member is coaxially disposed with the shaft in a state where the seal member is brought into slide contact with an outer peripheral surface of the shaft.

5. The shaft seal device according to claim 4, wherein a plurality of seal members are provided.

6. The shaft seal device according to any one of claims 1 to 3, further comprising:
   a rotary ring which is coaxially mounted on an outer periphery of the shaft and follows rotational movement of the shaft in a shaft circumferential direction; and
   a fixed ring which is coaxially mounted on the outer periphery of the shaft in a state where the fixed ring is brought into slide contact with the rotary ring, and has rotational movement thereof in the shaft circumferential direction of the shaft restricted, wherein
   the seal member is provided to a slide contact portion between the rotary ring and the fixed ring.

7. A hydroelectric power generator provided with the shaft seal device according to any one of claims 1 to 3 and 5.

8. The shaft seal device according to claim 1, wherein the porous body has a crosslinking ratio value within a range of 1 to 87%.

9. The shaft seal device according to claim 8, wherein the crosslinking ratio value of the porous body is within the range of 20 to 80%.

10. A seal member of a shaft seal device which is arranged on a periphery of a shaft in a rotatable manner or in a reciprocating manner so as to secure liquid tightness around the shaft, wherein
   the seal member is formed into a porous state using a hydrophilic polymer resin in which chains are cross-linked and the hydrophilic polymer of the hydrophilic polymer resin is polyvinyl formal in which chains of polyvinyl alcohol are cross-lined by formaldehyde, and
   an aqueous lubricant, which is prepared by adding polyethylene glycol to an aqueous solvent, is impregnated into the seal member.

11. A seal member in a shaft seal device, the seal member comprising a porous body comprised of a hydrophilic polymer resin in which chains are cross-linked and the hydrophilic polymer of the hydrophilic polymer resin is polyvinyl formal in which chains of polyvinyl alcohol are cross-lined by formaldehyde, and the porous body being impregnated with an aqueous lubricant, which is prepared by adding polyethylene glycol to an aqueous solvent.

* * * * *